United States Patent
Liu et al.

(10) Patent No.: US 11,895,535 B2
(45) Date of Patent: Feb. 6, 2024

(54) WIRELESS BACKHAUL SYSTEM AND COMMUNICATION METHOD AND APPARATUS

(71) Applicant: HUAWEI TECHNOLOGIES CO., LTD., Shenzhen (CN)

(72) Inventors: Jing Liu, Shanghai (CN); Mingzeng Dai, Shenzhen (CN); Yuanping Zhu, Shenzhen (CN); Yibin Zhuo, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 227 days.

(21) Appl. No.: 17/398,183

(22) Filed: Aug. 10, 2021

(65) Prior Publication Data
US 2021/0377802 A1 Dec. 2, 2021

Related U.S. Application Data

(63) Continuation of application No. PCT/CN2020/075435, filed on Feb. 14, 2020.

(30) Foreign Application Priority Data

Feb. 15, 2019 (CN) .......................... 201910118153.9

(51) Int. Cl.
*H04W 28/08* (2023.01)
*H04W 28/086* (2023.01)
(Continued)

(52) U.S. Cl.
CPC ....... *H04W 28/0862* (2023.05); *H04W 28/16* (2013.01); *H04W 80/02* (2013.01); *H04W 84/047* (2013.01); *H04W 92/20* (2013.01)

(58) Field of Classification Search
CPC ... H04W 28/16; H04W 80/02; H04W 84/047; H04W 92/20
See application file for complete search history.

(56) References Cited

U.S. PATENT DOCUMENTS 10,631,346 B2 * 4/2020 Hampel ................ H04W 84/04
11,076,259 B1 7/2021 Hovey et al.
(Continued)

OTHER PUBLICATIONS

Huawei, CP signalling transmission in IAB NSA. 3GPP TSG-RAN WG3 #102, Spokane, US, Nov. 12-16, 2018, R3-186538, 8 pages.
(Continued)

*Primary Examiner* — Fahmida S Chowdhury
(74) *Attorney, Agent, or Firm* — Maier & Maier, PLLC

(57) ABSTRACT

A wireless backhaul method, including: a wireless backhaul device generates a first F1AP message, maps the first F1AP message to a signaling-plane bearer of an LTE Uu interface, and sends the first F1AP message to a primary base station of the wireless backhaul device via the signaling-plane bearer of the LTE Uu interface. The primary base station obtains the first F1AP message via the signaling-plane bearer of the LTE Uu interface, encapsulates the first F1AP message into a first X2AP message, and sends the first X2AP message to a secondary base station of the wireless backhaul device. The secondary base station receives the first X2AP message and obtains the first F1AP message based on the first X2AP message.

20 Claims, 19 Drawing Sheets

(51) Int. Cl.
*H04W 28/16* (2009.01)
*H04W 80/02* (2009.01)
*H04W 84/04* (2009.01)
*H04W 92/20* (2009.01)

(56) References Cited

U.S. PATENT DOCUMENTS

| | | | | |
|---|---|---|---|---|
| 2018/0035334 A1* | 2/2018 | Lohar | ............... | H04W 24/02 |
| 2018/0041936 A1* | 2/2018 | Kim | ............... | H04W 48/12 |
| 2018/0367230 A1* | 12/2018 | Su | ............... | H04W 76/16 |
| 2019/0053317 A1* | 2/2019 | Hampel | ............... | H04W 28/082 |
| 2019/0149365 A1* | 5/2019 | Chatterjee | ............... | H04L 5/0094 |
| | | | | 370/329 |
| 2019/0159277 A1* | 5/2019 | Zhu | ............... | H04L 45/16 |
| 2019/0182211 A1* | 6/2019 | Yang | ............... | H04L 69/326 |
| 2020/0084688 A1* | 3/2020 | Mildh | ............... | H04W 88/08 |
| 2020/0178326 A1* | 6/2020 | Sirotkin | ............... | H04W 76/12 |
| 2020/0205156 A1* | 6/2020 | Adjakple | ............... | H04W 72/02 |
| 2020/0413457 A1* | 12/2020 | Hong | ............... | H04W 76/10 |
| 2021/0014768 A1* | 1/2021 | Hong | ............... | H04W 40/22 |
| 2021/0076368 A1* | 3/2021 | Malkamäki | ............... | H04W 76/12 |
| 2021/0258244 A1* | 8/2021 | Xu | ............... | H04L 45/28 |
| 2021/0409328 A1* | 12/2021 | Xu | ............... | H04W 8/26 |
| 2022/0039189 A1* | 2/2022 | Wu | ............... | H04L 5/0048 |
| 2022/0141732 A1* | 5/2022 | Wu | ............... | H04W 36/08 |
| | | | | 370/331 |

OTHER PUBLICATIONS

ZTE, Sanechips, Control plane signaling delivery in NSA deployment. 3GPP TSG RAN WG2 Meeting #104, Spokane, USA, Nov. 12-16, 2018, R2-1817420, 6 pages.

ZTE, Control plane signaling delivery in NSA deployment. 3GPP TSG RAN WG3 Meeting #101Bis, Chengdu, China, Oct. 8-12, 2018, R3-185536, 4 pages.

Huawei, Hisilicon, CP signalling transmission in IAB NSA, 3GPP TSG-RAN WG2 #104, Spokane, US, Nov. 12-16, 2018, R2-1817836, 8 pages.

Huawei, Hisilicon, SRB Types for Control Plane Alternative 2, 3GPP TSG-RAN WG2 #104, Spokane, US, Nov. 12-16, 2018, R2-1818277, 6 pages.

3GPP TR 38.874 0.7.0 (Nov. 2018), 3rd Generation Partnership Project; Technical Specification Group Radio Access Network; Study on Integrated Access and Backhaul; (Release 15), 111 pages.

* cited by examiner

WIRELESS BACKHAUL SYSTEM AND COMMUNICATION METHOD AND APPARATUS

CROSS-REFERENCE TO RELATED APPLICATIONS

This application is a continuation of International Application No. PCT/CN2020/075435, filed on Feb. 14, 2020, which claims priority to Chinese Patent Application No. 201910118153.9, filed on Feb. 15, 2019. The aforementioned disclosures are hereby incorporated by reference in their entireties.

TECHNICAL FIELD

Embodiments relate to the field of communications technologies, and specifically, to a wireless backhaul system and a communication method and apparatus.

BACKGROUND

An integrated access and backhaul (IAB) network architecture in 3rd-generation partnership project (3GPP) R15 includes an IAB node and an IAB donor. When a centralized unit (CU)-distributed unit (DU) architecture is considered, the IAB donor includes an IAB donor CU and an IAB donor DU, and the IAB node includes an IAB node mobile terminal (MT) function unit and an IAB node DU. The IAB node MT function unit is used as a user equipment (UE) module, may also be referred to as IAB node UE (or an IAB MT), and is responsible for communication with a parent node of the IAB node MT function unit. The IAB node DU serves as a DU to provide access services for UE attached to the IAB node DU or another IAB node. The IAB node MT function unit accesses an evolved node base station (eNB) in a long term evolution (LTE) system through a network access procedure of the UE. The LTE eNB configures a new radio (NR) frequency measurement configuration for the IAB node MT function unit, and selects an NR IAB donor as a secondary base station of the IAB node MT function unit based on a test reporting result of the IAB node MT function unit. That is, for the IAB node MT function unit, the LTE eNB serves as a primary base station, and the NR IAB donor serves as the secondary base station. The IAB node may work in a standalone (SA) mode or may work in a non-standalone (NSA) mode. Refer to a schematic diagram of a network architecture in the NSA mode in which the UE and the IAB node work, as shown in FIG. 1. In an NSA network deployment scenario in FIG. 1, the LTE eNB is connected to a core network, that is, an evolved packet core (EPC), in the LTE system, and the IAB donor is not connected to a core network control plane entity (MME) in the LTE system. For the UE in FIG. 1, the LTE eNB serves as the primary base station, and the NR IAB donor CU and the IAB node DU serve as a secondary base station. The UE accesses the IAB donor via the IAB node. That is, a physical (PHY) layer/media access control (MAC) layer/radio link control (RLC) layer that is peer to the UE and that is on an NR Uu interface is located on the IAB node DU, and a packet data convergence protocol (PDCP) layer/RRC layer or the like is located on the IAB donor CU.

Currently, three signaling transmission solutions in the NSA mode are proposed. In a first solution, a signaling radio bearer (SRB) 3 is set up between the IAB node and the IAB donor, to transmit an NR radio resource control (RRC) message of the IAB node MT function unit and an F1 application protocol (AP) message of the IAB node DU. An SRB 3 is also set up between the UE and the IAB donor, to transmit an NR RRC message of the UE. In a second solution, there is no SRB 3 but only a data radio bearer (DRB) between the IAB node and the IAB donor. Therefore, an NR RRC message of the IAB node MT function unit and an F1AP message of the IAB node DU need to be forwarded to the IAB donor CU via the LTE eNB. There is no SRB 3 but only a DRB between the UE and the IAB donor, either. An NR RRC message of the UE is also forwarded to the IAB donor CU via the LTE eNB. In a third solution, an SRB 3 is set up between the IAB node and the IAB donor, but there is no SRB 3 between the UE and the IAB donor. The NR RRC message of the IAB node MT function unit is an NR RRC message transmitted between the IAB node MT function unit and the IAB donor CU. The F1AP message of the IAB node DU is an F1AP message transmitted between the IAB node DU and the IAB donor CU.

Although the three signaling transmission solutions in the NSA mode are proposed, in these three signaling transmission solutions, a solution as to how to transmit the F1AP message between the IAB node DU and the IAB donor CU is not specifically provided. Therefore, how to transmit the F1AP message between the IAB node DU and the IAB donor CU is a technical problem to be urgently resolved.

SUMMARY

A problem to be resolved in embodiments is to provide a wireless backhaul system and a communication method and apparatus, to specify a solution to transmission of an F1AP message between an IAB node DU and an IAB donor CU, and ensure the transmission of the F1AP message.

A first aspect of the embodiments provides a wireless backhaul system. The wireless backhaul system includes a wireless backhaul device, a secondary base station of the wireless backhaul device, and a primary base station of the wireless backhaul device. The wireless backhaul device includes an MT function unit and a DU. The secondary base station includes a CU.

The wireless backhaul device is configured to: generate a first F1AP message on the DU, and send the first F1AP message to the MT function unit by using the DU; and map, on the MT function unit, the first F1AP message to a signaling-plane bearer of an LTE Uu interface, and send the first F1AP message to the primary base station via the signaling-plane bearer of the LTE Uu interface.

The primary base station is configured to: obtain the first F1AP message from the MT function unit via the signaling-plane bearer of the LTE Uu interface, and encapsulate the first F1AP message into a first X2AP message; or obtain a first RRC message of a first standard via the signaling-plane bearer of the LTE Uu interface, where the first RRC message of the first standard includes the first F1AP message, and encapsulate the first RRC message of the first standard into a first X2AP message; and send the first X2AP message to the CU of the secondary base station.

The secondary base station is configured to: receive, on the CU, the first X2AP message from the primary base station, and obtain, on the CU, the first F1AP message based on the first X2AP message.

The first aspect of the embodiments is applied to a scenario in which the wireless backhaul device sends an F1AP message to the secondary base station by using the primary base station, to specify a solution to transmission of the F1AP message between the wireless backhaul device and the secondary base station in this scenario and ensure the transmission of the F1AP message in this scenario.

In a possible implementation, the wireless backhaul device is configured to: include, on the MT function unit, the first F1AP message in the first RRC message of the first standard, and encapsulate the first RRC message of the first standard into a first RRC message of a second standard; and map the first RRC message of the second standard to the signaling-plane bearer of the LTE Uu interface, and send the first RRC message of the second standard to the primary base station via the signaling-plane bearer of the LTE Uu interface.

The primary base station is configured to: receive the first RRC message of the second standard from the MT function unit via the signaling-plane bearer of the LTE Uu interface, where the first RRC message of the second standard includes the first RRC message of the first standard; obtain the first RRC message of the first standard from the first RRC message of the second standard, where the first RRC message of the first standard includes the first F1AP message; and encapsulate the first RRC message of the first standard into the first X2AP message.

The secondary base station is configured to obtain, on the CU, the first F1AP message from the first RRC message of the first standard included in the first X2AP message.

Corresponding to this manner, a case in which the secondary base station sends an F1AP message to the wireless backhaul device is as follows:

The secondary base station is further configured to: generate a second F1AP message on the CU, include the second F1AP message in a second RRC message of the first standard, encapsulate the second RRC message of the first standard into a second X2AP message, and send the second X2AP message to the primary base station by using the CU.

The primary base station is further configured to: receive the second X2AP message from the secondary base station, obtain the second RRC message of the first standard from the second X2AP message, and encapsulate the second RRC message of the first standard into a second RRC message of the second standard; and map the second RRC message of the second standard to the signaling-plane bearer of the LTE Uu interface, and send the second RRC message of the second standard to the MT function unit via the signaling-plane bearer of the LTE Uu interface.

The wireless backhaul device is further configured to: receive, on the MT function unit, the second RRC message of the second standard from the primary base station via the signaling-plane bearer of the LTE Uu interface, obtain the second RRC message of the first standard from the second RRC message of the second standard, and obtain the second F1AP message from the second RRC message of the first standard; and send the second F1AP message to the DU by using the MT function unit.

In a possible implementation, the wireless backhaul device is configured to: encapsulate, on the MT function unit, the first F1AP message into a first RRC message of a second standard, map the first RRC message of the second standard to the signaling-plane bearer of the LTE Uu interface, and send the first RRC message of the second standard to the primary base station via the signaling-plane bearer of the LTE Uu interface.

The primary base station is configured to: receive the first RRC message of the second standard from the MT function unit via the signaling-plane bearer of the LTE Uu interface and encapsulate the first F1AP message included in the RRC message of the second standard into the first X2AP message.

The secondary base station is configured to obtain, on the CU, the first F1AP message included in the first X2AP message.

Corresponding to this manner, a case in which the secondary base station sends an F1AP message to the wireless backhaul device is as follows:

The secondary base station is further configured to: generate a second F1AP message on the CU, directly encapsulate the second F1AP message into a second X2AP message, and send the second X2AP message to the primary base station by using the CU.

The primary base station is further configured to: receive the second X2AP message from the secondary base station, obtain the second F1AP message from the second X2AP message, and encapsulate the second F1AP message into a second RRC message of the second standard; and map the second RRC message of the second standard to the signaling-plane bearer of the LTE Uu interface, and send the second RRC message of the second standard to the MT function unit via the signaling-plane bearer of the LTE Uu interface.

The wireless backhaul device is further configured to: receive, on the MT function unit, the second RRC message of the second standard from the primary base station via the signaling-plane bearer of the LTE Uu interface, and obtain the second F1AP message from the second RRC message of the second standard; and send the second F1AP message to the DU by using the MT function unit.

In a possible implementation, the wireless backhaul device is configured to: encapsulate, on the MT function unit, the first F1AP message into the first RRC message of the first standard, map the first RRC message of the first standard to the signaling-plane bearer of the LTE Uu interface, and send the first RRC message of the first standard to the primary base station via the signaling-plane bearer of the LTE Uu interface.

The primary base station is configured to: receive the first RRC message of the first standard from the MT function unit via the signaling-plane bearer of the LTE Uu interface, where the first RRC message of the first standard includes the first F1AP message and encapsulate the RRC message of the first standard into the first X2AP message.

The secondary base station is configured to obtain, on the CU, the first F1AP message from the first RRC message of the first standard included in the first X2AP message.

Corresponding to this manner, a case in which the secondary base station sends an F1AP message to the wireless backhaul device is as follows:

The secondary base station is further configured to: generate a second F1AP message on the CU, include the second F1AP message in a second RRC message of the first standard, encapsulate the second RRC message of the first standard into a second X2AP message, and send the second X2AP message to the primary base station by using the CU.

The primary base station is further configured to: receive the second X2AP message from the secondary base station, obtain the second RRC message of the first standard from the second X2AP message; and map the second RRC message of the first standard to the signaling-plane bearer of the LTE Uu interface, and send the second RRC message of the first standard to the MT function unit via the signaling-plane bearer of the LTE Uu interface.

The wireless backhaul device is further configured to: receive, on the MT function unit, the second RRC message of the first standard from the primary base station via the signaling-plane bearer of the LTE Uu interface, and obtain the second F1AP message from the second RRC message of the first standard; and send the second F1AP message to the DU by using the MT function unit.

In a possible implementation, the wireless backhaul device is configured to: directly map, on the MT function unit, the first F1AP message to the signaling-plane bearer of the LTE Uu interface and send the first F1AP message to the primary base station via the signaling-plane bearer of the LTE Uu interface.

The primary base station is configured to: receive the first F1AP message from the MT function unit via the signaling-plane bearer of the LTE Uu interface and encapsulate the first F1AP message into the first X2AP message.

The secondary base station is configured to obtain, on the CU, the first F1AP message included in the first X2AP message.

Corresponding to this manner, a case in which the secondary base station sends an F1AP message to the wireless backhaul device is as follows:

The secondary base station is further configured to: generate a second F1AP message on the CU, directly encapsulate the second F1AP message into a second X2AP message, and send the second X2AP message to the primary base station by using the CU.

The primary base station is further configured to: receive the second X2AP message from the secondary base station, obtain the second F1AP message from the second X2AP message; and map the second F1AP message to the signaling-plane bearer of the LTE Uu interface, and send the second F1AP message to the MT function unit via the signaling-plane bearer of the LTE Uu interface.

The wireless backhaul device is further configured to: receive, on the MT function unit, the second F1AP message from the primary base station via the signaling-plane bearer of the LTE Uu interface; and send the second F1AP message to the DU by using the MT function unit.

A second aspect of the embodiments provides a communication method. The method is applied to a wireless backhaul system. The wireless backhaul system includes a wireless backhaul device and a primary base station of the wireless backhaul device. The wireless backhaul device includes an MT function unit and a DU. The method includes:

the wireless backhaul device generates a first F1AP message on the DU, and sends the first F1AP message to the MT function unit by using the DU; and the wireless backhaul device maps, on the MT function unit, the first F1AP message to a signaling-plane bearer of an LTE Uu interface, and sends the first F1AP message to the primary base station via the signaling-plane bearer of the LTE Uu interface.

In the second aspect of the embodiments, corresponding to the wireless backhaul device in the system provided in the first aspect, the wireless backhaul device generates the first F1AP message, and sends the first F1AP message to the primary base station via the signaling-plane bearer of the LTE Uu interface, so that the primary base station sends the first F1AP message to a secondary base station of the wireless backhaul device, to specify a solution to transmission of an F1AP message between the wireless backhaul device and the secondary base station of the wireless backhaul device, and ensure the transmission of the F1AP message.

In a possible implementation, the wireless backhaul device includes, on the MT function unit, the first F1AP message in a first RRC message of a first standard, and encapsulates the first RRC message of the first standard into a first RRC message of a second standard; and maps, on the MT function unit, the first RRC message of the second standard to the signaling-plane bearer of the LTE Uu interface, and sends the first RRC message of the second standard to the primary base station via the signaling-plane bearer of the LTE Uu interface.

The first RRC message of the first standard includes first indication information, where the first indication information is used to indicate that the first RRC message of the first standard includes an F1AP message, that is, indicate that a message type carried in the first RRC message of the first standard is an F1AP message, so that a receive end learns that the type of the message included in the first RRC message of the first standard is the F1AP message. In this embodiment, the first RRC message of the first standard is a first NR RRC message, and the first standard is an NR standard. The first RRC message of the second standard includes second indication information, where the second indication information is used to indicate that the first RRC message of the second standard includes an RRC message of the first standard, that is, indicate that a message type carried in the first RRC message of the second standard is the first standard, that is, the carried message type is an NR RRC message. In this embodiment, the first RRC message of the second standard is a first LTE RRC message, and the second standard is an LTE standard.

Corresponding to this manner, a case in which the wireless backhaul device performs receiving from the primary base station is as follows:

The wireless backhaul device receives, on the MT function unit, a second RRC message of the second standard from the primary base station via the signaling-plane bearer of the LTE Uu interface, where the second RRC message of the second standard includes a second RRC message of the first standard; obtains the second RRC message of the first standard from the second RRC message of the second standard, where the second RRC message of the first standard includes a second F1AP message, and the second F1AP message is an F1AP message generated by a CU of the secondary base station of the wireless backhaul device; and obtains the second F1AP message from the second RRC message of the first standard.

The wireless backhaul device sends the second F1AP message to the DU by using the MT function unit.

Similarly, first indication information is included in the second RRC message of the first standard and is used to indicate that the second RRC message of the first standard includes an F1AP message. Second indication information is included in the second RRC message of the second standard and is used to indicate that the second RRC message of the second standard includes an RRC message of the first standard.

In a possible implementation, the wireless backhaul device encapsulates, on the MT function unit, the first F1AP message into a first RRC message of a second standard.

The wireless backhaul device maps, on the MT function unit, the first RRC message of the second standard to the signaling-plane bearer of the LTE Uu interface, and sends the first RRC message of the second standard to the primary base station via the signaling-plane bearer of the LTE Uu interface.

The first RRC message of the second standard includes third indication information, where the third indication information is used to indicate that the first RRC message of the second standard includes an F1AP message, that is, indicate that a message type carried in the first RRC message of the second standard is an F1AP message.

Corresponding to this manner, a case in which the wireless backhaul device performs receiving from the primary base station is as follows:

The wireless backhaul device receives, on the MT function unit, a second RRC message of the second standard from the primary base station via the signaling-plane bearer of the LTE Uu interface, where the second RRC message of the second standard includes a second F1AP message, and the second F1AP message is an F1AP message generated by a CU of the secondary base station of the wireless backhaul device; and obtains the second F1AP message from the second RRC message of the second standard.

The wireless backhaul device sends the second F1AP message to the DU by using the MT function unit.

Similarly, the second RRC message of the second standard includes third indication information, where the third indication information is used to indicate that the first RRC message of the second standard includes an F1AP message.

In a possible implementation, the wireless backhaul device encapsulates, on the MT function unit, the first F1AP message into a first RRC message of a first standard, maps the first RRC message of the first standard to the signaling-plane bearer of the LTE Uu interface, and sends the first RRC message of the first standard to the primary base station via the signaling-plane bearer of the LTE Uu interface.

The first RRC message of the first standard includes fourth indication information, where the fourth indication information is used to indicate that the first RRC message of the first standard includes an F1AP message, that is, indicate that a message type carried in the first RRC message of the first standard is an F1AP message.

A PDCP layer corresponding to the signaling-plane bearer of the LTE Uu interface includes fifth indication information, where the fifth indication information is used to indicate that a message included at the PDCP layer is an RRC message of the first standard.

Corresponding to this manner, a case in which the wireless backhaul device performs receiving from the primary base station is as follows:

The wireless backhaul device receives, on the MT function unit, a second RRC message of the first standard from the primary base station via the signaling-plane bearer of the LTE Uu interface, where the second RRC message of the first standard includes a second F1AP message, and the second F1AP message is an F1AP message generated by a CU of the secondary base station of the wireless backhaul device; and obtains the second F1AP message from the second RRC message of the first standard.

The wireless backhaul device sends the second F1AP message to the DU by using the MT function unit.

Similarly, the second RRC message of the first standard includes fourth indication information, where the fourth indication information is used to indicate that the second RRC message of the first standard includes an F1AP message.

In a possible implementation, the wireless backhaul device directly maps, on the MT function unit, the first F1AP message to the signaling-plane bearer of the LTE Uu interface, and sends the first F1AP message to the primary base station via the signaling-plane bearer of the LTE Uu interface.

A PDCP layer corresponding to the signaling-plane bearer of the LTE Uu interface includes sixth indication information, where the sixth indication information is used to indicate that a message included at the PDCP layer is an F1AP message.

Corresponding to this manner, a case in which the wireless backhaul device performs receiving from the primary base station is as follows:

The wireless backhaul device receives, on the MT function unit, a second F1AP message from the primary base station via the signaling-plane bearer of the LTE Uu interface, where the second F1AP message is an F1AP message generated by a CU of the secondary base station of the wireless backhaul device.

The wireless backhaul device sends the second F1AP message to the DU by using the MT function unit.

A third aspect of the embodiments provides a wireless backhaul device. The wireless backhaul device has a function of implementing the method provided in the second aspect. The function may be implemented by hardware, or may be implemented by hardware by executing corresponding software. The hardware or software includes one or more modules corresponding to the function.

In a possible implementation, the wireless backhaul device includes an MT function unit and a DU. The DU is configured to: generate a first F1AP message, and send the first F1AP message to the MT function unit. The MT function unit is configured to: map the first F1AP message to a signaling-plane bearer of an LTE Uu interface, and send the first F1AP message to a primary base station via the signaling-plane bearer of the LTE Uu interface.

In a possible implementation, the wireless backhaul device includes a processor, a transceiver, and a memory. The transceiver is configured to receive and send information, the memory stores a computer program, the computer program includes program instructions, the processor is connected to the memory and the transceiver through a bus, and the processor executes the program instructions stored in the memory, to enable the wireless backhaul device to perform the following operations: generating a first F1AP message, mapping the first F1AP message to a signaling-plane bearer of an LTE Uu interface, and controlling the transceiver to send the first F1AP message to a primary base station via the signaling-plane bearer of the LTE Uu interface.

Based on a same concept, for a problem-resolving principle and beneficial effects of the wireless backhaul device, refer to the method described in the second aspect and beneficial effects brought by the method. Therefore, for implementation of the apparatus, refer to implementation of the method. Repeated content is not described again.

A fourth aspect of the embodiments provides a computer-readable storage medium. The computer-readable storage medium stores a computer program, the computer program includes program instructions, and when the program instructions are executed by a processor, the processor is enabled to perform the method according to the second aspect.

A fifth aspect of the embodiments provides a computer program product including instructions. When the computer program product runs on a computer, the computer is enabled to perform the method according to the second aspect.

A sixth aspect of the embodiments provides a communication method. The method is applied to a wireless backhaul system, the wireless backhaul system includes a wireless backhaul device, a secondary base station of the wireless backhaul device, and a primary base station of the wireless backhaul device. The secondary base station includes a CU. The method includes:

The secondary base station receives, on the CU, a first X2AP message from the primary base station; and the secondary base station obtains, on the CU, a first F1AP message based on the first X2AP message, where the first F1AP message is an F1AP message generated by the wireless backhaul device.

In the sixth aspect of the embodiments, corresponding to the secondary base station of the wireless backhaul device in the system provided in the first aspect, the secondary base station receives the first X2AP message from the primary base station, and obtains the first F1AP message based on the first X2AP message, to specify a solution to transmission of the F1AP message between the wireless backhaul device and the secondary base station of the wireless backhaul device, and ensure the transmission of the F1AP message.

In a possible implementation, the first X2AP message includes a first RRC message of a first standard, and the first RRC message of the first standard includes the first F1AP message. The secondary base station obtains, on the CU, the first F1AP message from the first RRC message of the first standard included in the first X2AP message.

Corresponding to this manner, a case in which the secondary base station performs sending to the primary base station is as follows:

The secondary base station generates a second F1AP message on the CU, encapsulates the second F1AP message into a second RRC message of the first standard, encapsulates the second RRC message of the first standard into a second X2AP message, and sends the second X2AP message to the primary base station.

In a possible implementation, the first X2AP message includes the first F1AP message. The secondary base station obtains, on the CU, the first F1AP message included in the first X2AP message.

Corresponding to this manner, a case in which the secondary base station performs sending to the primary base station is as follows:

The secondary base station generates a second F1AP message on the CU, directly encapsulates the second F1AP message into a second X2AP message, and sends the second X2AP message to the primary base station.

A seventh aspect of the embodiments provides a secondary base station. The secondary base station is a secondary base station of a wireless backhaul device. The secondary base station has a function of implementing the method provided in the sixth aspect. The function may be implemented by hardware, or may be implemented by hardware by executing corresponding software. The hardware or software includes one or more modules corresponding to the function.

In a possible implementation, the secondary base station includes a CU, configured to: receive a first X2AP message from a primary base station, and obtain a first F1AP message based on the first X2AP message, where the first F1AP message is an F1AP message generated by the wireless backhaul device.

In a possible implementation, the secondary base station includes a processor, a transceiver, and a memory. The transceiver is configured to receive and send information, the memory stores a computer program, the computer program includes program instructions, the processor is connected to the memory and the transceiver through a bus, and the processor executes the program instructions stored in the memory, to enable the secondary base station to perform the following operations: controlling the transceiver to receive a first X2AP message from a primary base station; and obtaining a first F1AP message based on the first X2AP message, where the first F1AP message is an F1AP message generated by the wireless backhaul device.

Based on a same concept, for a problem-resolving principle and beneficial effects of the secondary base station, refer to the method in the sixth aspect and beneficial effects brought by the method. Therefore, for implementation of the apparatus, refer to implementation of the method. Repeated content is not described again.

An eighth aspect of the embodiments provides a computer-readable storage medium. The computer-readable storage medium stores a computer program, the computer program includes program instructions, and when the program instructions are executed by a processor, the processor is enabled to perform the method according to the sixth aspect.

A ninth aspect of the embodiments provides a computer program product including instructions. When the computer program product runs on a computer, the computer is enabled to perform the method according to the sixth aspect.

A tenth aspect of the embodiments provides a communication method. The method is applied to a wireless backhaul system. The wireless backhaul system includes a wireless backhaul device, a secondary base station of the wireless backhaul device, and a primary base station of the wireless backhaul device. The wireless backhaul device includes an MT function unit and a DU. The secondary base station includes a CU. The method includes:

The primary base station obtains a first F1AP message from the MT function unit via a signaling-plane bearer of an LTE Uu interface, where the first F1AP message is an F1AP message generated by the DU, and encapsulates the first F1AP message into a first X2AP message; or obtains a first RRC message of a first standard, where the first RRC message of the first standard includes a first F1AP message, and the first F1AP message is an F1AP message generated by the DU, and encapsulates the first RRC message of the first standard into a first X2AP message; and the primary base station sends the first X2AP message to the CU of the secondary base station.

In the tenth aspect of the embodiments, corresponding to the primary base station of the wireless backhaul device in the system provided in the first aspect, the primary base station obtains the first F1AP message or the first RRC message of the first standard from the wireless backhaul device, encapsulates the first F1AP message or the first RRC message of the first standard into the first X2AP message, and sends the first X2AP message to the secondary base station of the wireless backhaul device, so that the secondary base station obtains the first F1AP message based on the first X2AP message, and implements transmission of the F1AP message between the wireless backhaul device and the secondary base station by using the primary base station.

A case in which the primary base station performs receiving from the secondary base station and sending to the wireless backhaul device is as follows:

In a possible implementation, the primary base station receives a second X2AP message from the secondary base station, where the second X2AP message includes a second RRC message of the first standard, the second RRC message of the first standard includes a second F1AP message, and the second F1AP message is an F1AP message generated by the CU of the secondary base station; obtains the second RRC message of the first standard from the second X2AP message, and encapsulates the second RRC message of the first standard into a second RRC message of the second standard; and maps the second RRC message of the second standard to the signaling-plane bearer of the LTE Uu interface, and sends the second RRC message of the second standard to the MT function unit via the signaling-plane bearer of the LTE Uu interface.

In a possible implementation, the primary base station receives a second X2AP message from the secondary base station, where the second X2AP message includes a second F1AP message, and the second F1AP message is an F1AP message generated by the CU of the secondary base station; obtains the second F1AP message from the second X2AP message, and encapsulates the second F1AP message into a second RRC message of the second standard; and maps the second RRC message of the second standard to the signaling-plane bearer of the LTE Uu interface, and sends the second RRC message of the second standard to the MT function unit via the signaling-plane bearer of the LTE Uu interface.

In a possible implementation, the primary base station receives a second X2AP message from the secondary base station, where the second X2AP message includes a second RRC message of the first standard, the second RRC message of the first standard includes a second F1AP message, and the second F1AP message is an F1AP message generated by the CU of the secondary base station; obtains the second RRC message of the first standard from the second X2AP message; and maps the second RRC message of the first standard to the signaling-plane bearer of the LTE Uu interface, and sends the second RRC message of the first standard to the MT function unit via the signaling-plane bearer of the LTE Uu interface.

In a possible implementation, the primary base station receives a second X2AP message from the secondary base station, where the second X2AP message includes a second F1AP message, and the second F1AP message is an F1AP message generated by the CU of the secondary base station; obtains the second F1AP message from the second X2AP message; and maps the second F1AP message to the signaling-plane bearer of the LTE Uu interface, and sends the second RRC message of the second standard to the MT function unit via the signaling-plane bearer of the LTE Uu interface.

An eleventh aspect of the embodiments provides a primary base station. The primary base station is a primary base station of a wireless backhaul device. The primary base station has a function of implementing the method provided in the tenth aspect. The function may be implemented by hardware, or may be implemented by hardware by executing corresponding software. The hardware or software includes one or more modules corresponding to the function.

In a possible implementation, the primary base station includes a transceiver unit and a processing unit. The transceiver unit is configured to obtain a first F1AP message from an MT function unit via a signaling-plane bearer of an LTE Uu interface, where the first F1AP message is an F1AP message generated by a DU; and the processing unit is configured to encapsulate the first F1AP message into a first X2AP message. Alternatively, the transceiver unit is configured to obtain a first RRC message of a first standard from an MT function unit via a signaling-plane bearer of an LTE Uu interface, where the first RRC message of the first standard includes a first F1AP message, and the first F1AP message is an F1AP message generated by a DU; and the processing unit is configured to encapsulate the first RRC message of the first standard into a first X2AP message. The transceiver unit is further configured to send the first X2AP message to a CU of a secondary base station.

In a possible implementation, the primary base station includes a processor, a transceiver, and a memory. The transceiver is configured to receive and send information, the memory stores a computer program, the computer program includes program instructions, the processor is connected to the memory and the transceiver through a bus, and the processor executes the program instructions stored in the memory, to enable the primary base station to perform the following operations: controlling the transceiver to obtain a first F1AP message from an MT function unit via a signaling-plane bearer of an LTE Uu interface, where the first F1AP message is an F1AP message generated by a DU, and encapsulating the first F1AP message into a first X2AP message; or controlling the transceiver to obtain a first RRC message of a first standard from an MT function unit via a signaling-plane bearer of an LTE Uu interface, where the first RRC message of the first standard includes a first F1AP message, and the first F1AP message is an F1AP message generated by a DU, and encapsulating the first RRC message of the first standard into a first X2AP message; and controlling the transceiver to send the first X2AP message to a CU of a secondary base station.

Based on a same concept, for a problem-resolving principle and beneficial effects of the primary base station, refer to the method in the tenth aspect and beneficial effects brought by the method. Therefore, for implementation of the apparatus, refer to implementation of the method. Repeated content is not described again.

A twelfth aspect of the embodiments provides a computer-readable storage medium. The computer-readable storage medium stores a computer program, the computer program includes program instructions, and when the program instructions are executed by a processor, the processor is enabled to perform the method according to the tenth aspect.

A thirteenth aspect of the embodiments provides a computer program product including instructions. When the computer program product runs on a computer, the computer is enabled to perform the method according to the tenth aspect.

A fourteenth aspect of the embodiments provides a wireless backhaul system. The wireless backhaul system includes a wireless backhaul device and a secondary base station of the wireless backhaul device. The wireless backhaul device includes an MT function unit and a first DU. The secondary base station includes a CU and a second DU.

The wireless backhaul device is configured to: generate a first F1AP message on the first DU, and send the first F1AP message to the MT function unit by using the first DU; encapsulate, on the MT function unit, the first F1AP message into a first RRC message of a first standard; and map the first RRC message of the first standard to a signaling-plane bearer of an NR Uu interface, and send the first RRC message of the first standard to the second DU via the signaling-plane bearer of the NR Uu interface.

The secondary base station is configured to: obtain, on the second DU, a first packet data convergence protocol PDCP protocol data unit PDU from the MT function unit via the signaling-plane bearer of the NR Uu interface, where the first PDCP PDU includes the first RRC message of the first standard; encapsulate the first PDCP PDU into a first F1-C interface message, and send the first F1-C interface message to the CU; and receive the first F1-C interface message on the CU, and obtain and parse the first F1AP message based on the first F1-C interface message.

The fourteenth aspect of the embodiments is applied to a scenario in which the wireless backhaul device directly communicates with the secondary base station of the wireless backhaul device, to specify a solution to transmission of an F1AP message between the wireless backhaul device and the secondary base station in this scenario and ensure the transmission of the F1AP message in this scenario. In the fourteenth aspect, the wireless backhaul device encapsulates the first F1AP message into the first RRC message of the first standard, and then sends the first RRC message of the first standard to the secondary base station of the wireless backhaul device via the signaling-plane bearer of the NR Uu interface.

The first DU is a DU on the wireless backhaul device, and the second DU is a DU on the secondary base station.

A case in which the secondary base station performs sending to the wireless backhaul device is as follows:

The secondary base station is further configured to: generate a second F1AP message on the CU, encapsulate the second F1AP message into a second RRC message of the first standard, and send the second RRC message of the first standard to the second DU; and send, on the second DU, the second RRC message of the first standard to the MT function unit.

The wireless backhaul device is further configured to: receive, on the MT function unit, the second RRC message of the first standard from the second DU, obtain the second F1AP message from the second RRC message of the first standard, and send the second F1AP message to the first DU; and parse the second F1AP message on the first DU.

A fifteenth aspect of the embodiments provides a wireless backhaul system. The wireless backhaul system includes a wireless backhaul device and a secondary base station of the wireless backhaul device. The wireless backhaul device includes an MT function unit and a first DU. The secondary base station includes a CU and a second DU.

The wireless backhaul device is configured to: generate a first F1AP message on the first DU, and send the first F1AP message to the MT function unit by using the first DU; and map, on the MT function unit, the first F1AP message to a signaling-plane bearer of an NR Uu interface, and send the first F1AP message to the second DU via the signaling-plane bearer of the NR Uu interface.

The secondary base station is configured to: obtain, on the second DU, a first PDCP PDU from the MT function unit via the signaling-plane bearer of the NR Uu interface, where the first PDCP PDU includes the first F1AP message; encapsulate the first PDCP PDU into a first F1-C interface message, and send the first F1-C interface message to the CU; and receive the first F1-C interface message on the CU, and obtain and parse the first F1AP message based on the first F1-C interface message.

The fifteenth aspect of the embodiments is applied to a scenario in which the wireless backhaul device directly communicates with the secondary base station of the wireless backhaul device, to specify a solution to transmission of an F1AP message between the wireless backhaul device and the secondary base station in this scenario and ensure the transmission of the F1AP message in this scenario. In the fifteenth aspect, the wireless backhaul device directly sends the first F1AP message to the secondary base station of the wireless backhaul device via the signaling-plane bearer of the NR Uu interface.

A case in which the secondary base station performs sending to the wireless backhaul device is as follows:

The secondary base station is further configured to: generate a second F1AP message on the CU, and send the second F1AP message to the second DU; and send, on the second DU, the second F1AP message to the MT function unit.

The wireless backhaul device is further configured to: receive, on the MT function unit, the second F1AP message from the second DU, and send the second F1AP message to the first DU; and parse the second F1AP message on the first DU.

A sixteenth aspect of the embodiments provides a communication method. The method is applied to a wireless backhaul system. The wireless backhaul system includes a wireless backhaul device and a secondary base station of the wireless backhaul device. The wireless backhaul device includes an MT function unit and a first DU. The secondary base station includes a CU and a second DU.

The wireless backhaul device generates a first F1AP message on the first DU, and sends the first F1AP message to the MT function unit by using the first DU.

The wireless backhaul device encapsulates, on the MT function unit, the first F1AP message into a first RRC message of a first standard, maps the first RRC message of the first standard to a signaling-plane bearer of an NR Uu interface, and sends the first RRC message of the first standard to the second DU via the signaling-plane bearer of the NR Uu interface.

In the sixteenth aspect of this embodiment, corresponding to the wireless backhaul device in the system provided in the fourteenth aspect, the first F1AP message is encapsulated into the first RRC message of the first standard, and then the first RRC message of the first standard is sent to the secondary base station of the wireless backhaul device via the signaling-plane bearer of the NR Uu interface.

A corresponding case in which the wireless backhaul device performs receiving from the secondary base station is as follows:

The wireless backhaul device receives, on the MT function unit, a second RRC message of the first standard from the second DU, where the second RRC message of the first standard includes a second F1AP message, and the second F1AP message is an F1AP message generated by the CU.

The wireless backhaul device obtains, on the MT function unit, the second F1AP message from the second RRC message of the first standard, and sends the second F1AP message to the first DU.

The wireless backhaul device parses the second F1AP message on the first DU.

A seventeenth aspect of the embodiments provides a communication method. The method is applied to a wireless backhaul system. The wireless backhaul system includes a wireless backhaul device and a secondary base station of the wireless backhaul device. The wireless backhaul device includes an MT function unit and a first DU. The secondary base station includes a CU and a second DU.

The wireless backhaul device generates a first F1AP message on the first DU.

The wireless backhaul device maps, on the MT function unit, the first F1AP message to a signaling-plane bearer of an NR Uu interface, and sends the first F1AP message to the second DU via the signaling-plane bearer of the NR Uu interface.

In the seventeenth aspect of the embodiments, corresponding to the wireless backhaul device in the system provided in the fifteenth aspect, the first F1AP message is directly sent to the secondary base station of the wireless backhaul device via the signaling-plane bearer of the NR Uu interface.

BRIEF DESCRIPTION OF DRAWINGS

To describe solutions in embodiments more clearly, the following describes the accompanying drawings for describing the embodiments.

DETAILED DESCRIPTION OF THE EMBODIMENTS

Figure 1:
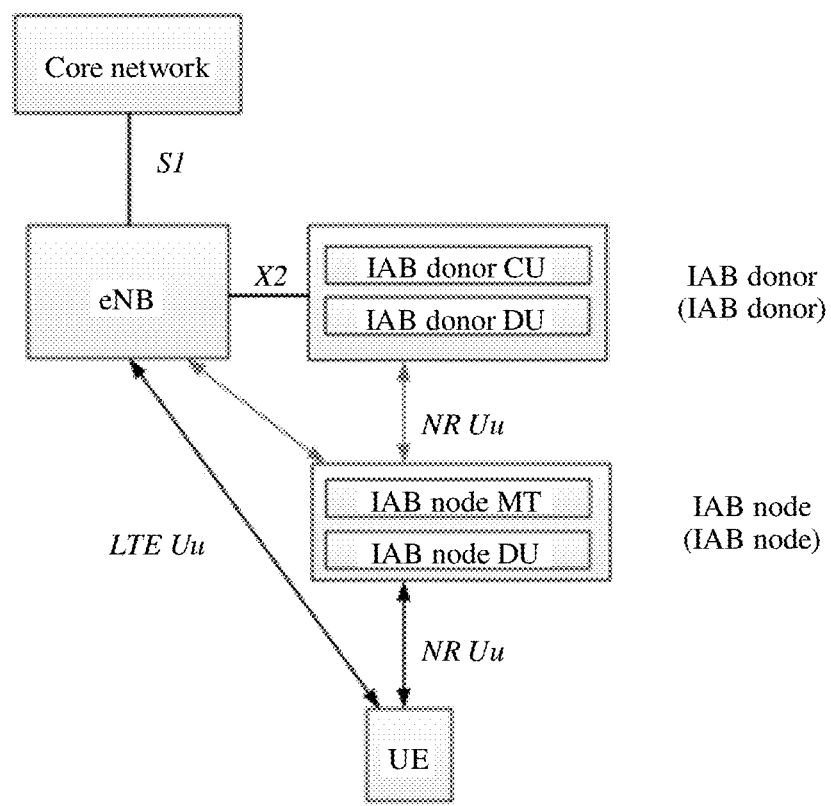
FIG. 1 is a schematic diagram of a network architecture in which UE and an IAB node work in an NSA mode.

The following describes solutions in embodiments with reference to the accompanying drawings. In descriptions, "/" represents an "or" relationship between associated objects unless otherwise specified. For example, A/B may represent A or B. The term "and/or" describes only an association relationship between associated objects and indicates that three relationships may exist. For example, A and/or B may indicate the following three cases: only A exists, both A and B exist, and only B exists, where A and B may be singular or plural. In addition, in the descriptions, unless otherwise specified, "a plurality of" indicates two or more. "At least one item of the following" or a similar expression thereof indicates any combination of these items, including a single item or any combination of a plurality of items. For example, at least one of a, b, or c may indicate: a; b; c; a and b; a and c; b and c; or a, b, and c, where a, b, and c may be singular or plural. In addition, to clearly describe the solutions in the embodiments, in the embodiments, terms such as "first" and "second" are used to distinguish between same or similar objects whose functions and purposes are basically the same. A person of ordinary skill in the art may understand that the terms such as "first" and "second" do not limit a quantity or an execution sequence, and the terms such as "first" and "second" do not indicate a definite difference.

In addition, a network architecture and a service scenario that are described in the embodiments are intended to describe the solutions in the embodiments more clearly, and do not constitute a limitation on the solutions provided in the embodiments. A person of ordinary skill in the art may understand that with evolution of the network architecture and emergence of a new service scenario, the solutions provided in the embodiments are also applicable to similar problems.

The following describes names or terms used in the embodiments.

An IAB donor can be an IAB donor node. In the embodiments, the IAB donor is referred to as an IAB donor, and the IAB donor node is referred to as an IAB donor node or a donor IAB node, but the names are not limited. Alternatively, the IAB donor node may be referred to as a donor node/base station, a donor IAB base station, or the like. Other names for describing the IAB donor should fall within the protection scope of the embodiments. The IAB donor includes an IAB donor CU and an IAB donor DU. One IAB donor includes one IAB donor CU and one or more IAB donor DUs. An IAB node MT function unit works in an NSA mode, and the IAB donor serves as a secondary base station of the IAB node MT function unit. This may be similar to that a gNB serves as a secondary base station of UE in an EN-DC scenario. When the UE works in the NSA mode, the IAB donor CU and an IAB node DU together serve as the secondary base station of the UE. This may be similar to that the gNB serves as the secondary base station of the UE in the EN-DC scenario. That is, a physical (PHY) layer/media access control (MAC) layer/radio link control (RLC) layer that is peer to the UE and that is on an NR Uu interface is located on the IAB node DU, and a packet data convergence protocol (PDCP) layer/RRC layer or the like is located on the IAB donor CU.

An IAB node is equivalent to a relay node or a data backhaul node, and may be referred to as a wireless backhaul device, a data backhaul device, a relay device, or the like. In the embodiments, the IAB node is referred to as a wireless backhaul device, but this constitutes no limitation on the embodiments. The IAB node includes an IAB node MT function unit and an IAB node DU. As a UE module, the IAB node MT function unit is responsible for communicating with a parent node of the IAB node MT function unit and providing a channel for data backhaul of a child node of the IAB node MT function unit. The IAB node DU serves as a DU to provide access services for UE attached to the IAB node DU or another IAB node. The IAB node MT function unit accesses an LTE eNB through a network access procedure of the UE. The LTE eNB configures an NR frequency measurement configuration for the IAB node MT function unit, and selects an NR IAB donor as a secondary base station of the IAB node MT function unit based on a test report result of the IAB node MT function unit. That is, for the IAB node MT function unit, the LTE eNB serves as a primary base station, and an NR IAB donor CU and an NR IAB donor DU serve as the secondary base station.

In the embodiments, the IAB node DU may generate an F1AP message. The F1AP message may further include two types: a UE-associated (associated) F1AP message and a non-UE-associated F1AP message. The non-UE-associated F1AP message is mainly used for a management message, for example, an F1 setup request message, of an F1 interface between the IAB node DU and the IAB donor CU. The UE-associated F1AP message is mainly used for UE context management, RRC message transmission, or the like. The RRC message is, for example, a UE context setup request message or an uplink (UL) RRC message transfer message. The IAB node DU generates an F1AP message, and transmits the F1AP message to the IAB node MT function unit through an internal interface of the IAB node; and the IAB node MT function unit may transmit the F1AP message to the IAB donor CU through an LTE Uu interface and an X2 interface. Alternatively, the IAB node MT function unit directly transmits the F1AP message to the IAB donor DU via a signaling-plane bearer of the NR Uu interface; and then the IAB donor DU transmits the F1AP message to the IAB donor CU through an internal F1 interface of the IAB donor. Correspondingly, the IAB donor CU may generate an F1AP message, for example, generate an F1 setup response message, a UE context setup response message, and a downlink (DL) RRC message transfer message. The IAB donor CU may transmit the F1AP message to the IAB node MT function unit through the LTE Uu interface and the X2 interface; and then the IAB node MT function unit transmits the F1AP message to the IAB node DU through the internal interface of the IAB node. Alternatively, the IAB donor CU transmits the F1AP message to the IAB donor DU through the internal F1 interface of the IAB donor; the IAB donor DU transmits the F1AP message to the IAB node MT function unit via a signaling-plane bearer of the NR Uu interface; and then the IAB node MT function unit transmits the F1AP message to the IAB node DU through the internal interface of the IAB node.

In an SA mode, the UE is connected to only one base station, an SRB (for example, an SRB 1 or an SRB 2) is set up between the UE and the base station, and the base station is connected to both a core network control plane entity and a user plane entity. In an IAB scenario, when working in the SA mode, the UE may access the IAB donor via the IAB node. The IAB donor is connected to a core network. The PHY/MAC/RLC layer peer to the UE is located on the IAB node DU, and the peer PDCP/RRC layer is located on the IAB donor CU. When working in the SA mode, the IAB node MT function unit works and may access the IAB donor. The IAB donor is connected to a core network. The PHY/MAC/RLC layer peer to the IAB node MT function unit is located on the IAB donor DU. The peer PDCP/RRC layer is located on the IAB donor CU.

In the NSA mode, there may be no SRB 3 between UE and the secondary base station, that is, there is no direct signaling transmission path. In this case, signaling between the UE and the secondary base station needs to be forwarded via the LTE eNB, there is no connection between the secondary base station and the core network control plane entity, and the LTE eNB accesses a core network. In the IAB scenario, when the UE works in the NSA mode, if there is no SRB 3 set up between the UE and the secondary base station, an NR RRC message of the UE is encapsulated into an LTE RRC message and forwarded via the LTE eNB. The NR RRC message of the UE is an NR RRC message transmitted between the UE and the IAB donor CU. Similarly, the IAB node MT function unit works in the NSA mode, and if there is no SRB 3 set up between the IAB node MT function unit and the secondary base station, an NR RRC message of the IAB node MT function unit and an F1AP message of the IAB node DU are forwarded via the LTE eNB. The NR RRC message of the IAB node MT function unit is an NR RRC message transmitted between the IAB node MT function unit and the IAB donor CU. The F1AP message of the IAB node DU is an F1AP message transmitted between the IAB node DU and the IAB donor CU.

An X2AP message is a message transmitted between the LTE eNB and an NR gNB by using an protocol, and an X2 is an interface between the LTE eNB and the NR gNB. In the IAB scenario, the X2AP message is a message transmitted between the LTE eNB and the IAB donor by using an protocol. In this case, the X2 is an interface between the LTE eNB and the IAB donor. For example, if the IAB donor uses a CU-DU split architecture, the X2 is an interface between the LTE eNB and the IAB donor CU.

The F1AP message is used in the IAB scenario and is a message transmitted between the IAB node DU and the IAB donor CU by using an protocol. All messages exchanged between the IAB node DU and the IAB donor CU are collectively referred to as F1AP messages. The F1AP message may be a UE-associated F1AP message or a non-UE-associated F1AP message. For example, the F1AP message may be an F1 setup request message, an F1 setup response message, a UE context setup request message, a UE context setup response message, a UL RRC message transfer message, a DL RRC message transfer message, or the like. The name "F1AP message" constitutes no limitation on the embodiments, and another name for essentially describing the F1AP message should fall within the protection scope of the embodiments.

The F1 interface is an interface between the IAB donor DU and the IAB donor CU, and an interface between the IAB node DU and the IAB donor CU.

The LTE Uu interface is an interface between the LTE eNB and the UE. In the IAB scenario, the LTE Uu interface may alternatively be an interface between the LTE eNB and the IAB node MT function unit.

A signaling-plane bearer of the LTE Uu interface may be the existing SRB 1 or SRB 2, or may be a newly defined SRB for transmitting the F1AP message. The newly defined SRB is a signaling-plane bearer between the IAB node MT function unit and the LTE eNB.

The NR Uu interface is an interface between the UE and the gNB. In the IAB scenario, the NR Uu interface may alternatively be an interface between the IAB node MT function unit and the IAB donor DU, may be an interface (through which the UE accesses the IAB node DU) between the UE and the IAB node DU, may be an interface (through which the UE accesses the IAB donor DU) between the UE and the IAB donor DU, or may be an interface (through which the IAB node accesses a parent node IAB node of the IAB node, applicable to a multi-hop backhaul link scenario) between the IAB node MT function unit and the parent node IAB node DU of the IAB node MT function unit.

The signaling-plane bearer of the NR Uu interface may be the existing SRB 3, or may be a newly defined SRB for transmitting the F1AP message. The newly defined SRB is a signaling-plane bearer between the IAB node MT function unit and the IAB donor DU.

In the embodiments, an RRC message of a first standard is an NR RRC message. An RRC message of a second standard is an LTE RRC message.

In 3GPP R15 evolved universal terrestrial radio access-new radio dual-connectivity (EN-DC), an eNB in an LTE system serves as the primary base station of UE, and a next generation node basestation (gNB) in an NR system serves as the secondary base station of the UE. In this scenario, there are two types of RRC messages of the UE: an LTE RRC message and an NR RRC message. The LTE RRC message may be transmitted via an SRB (for example, the SRB 1 or the SRB 2) on the LTE Uu interface (that is, an interface between the UE and the eNB). There are two manners of transmitting the NR RRC message. Downlink transmission is used as an example. One manner is that the gNB generates the NR RRC message, encapsulates the NR RRC message, as an RRC container, into the X2AP message, and sends the X2AP message to the eNB. The eNB extracts the RRC container from the X2AP message, encapsulates the RRC container into the LTE RRC message, and sends the LTE RRC message to the UE via the SRB on the LTE Uu interface. The other manner is that the SRB 3 is set up between the UE and the gNB, and the gNB may directly send the generated NR RRC message to the UE via the SRB 3.

Figure 2A:
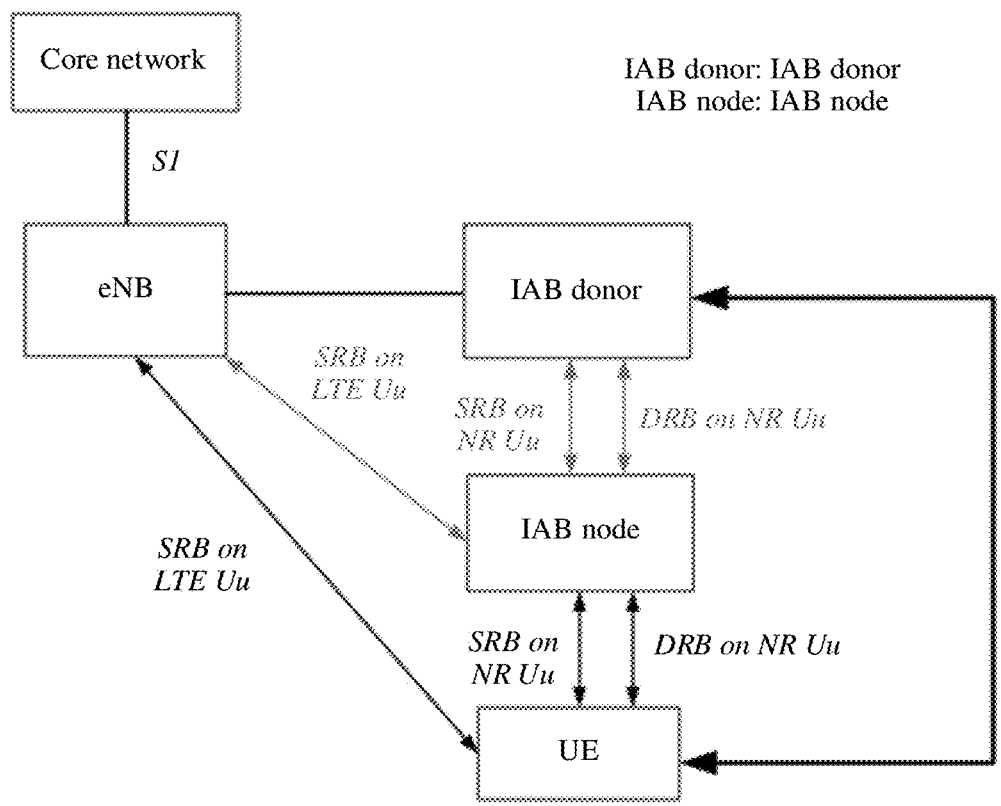
FIG. 2a is a schematic diagram of a first signaling transmission solution.

When the UE and the IAB node work in the NSA mode, three signaling transmission solutions may be included:

A first signaling transmission solution is shown in FIG. 2a: the SRB 3 is set up between the IAB node and the IAB donor, and the SRB 3 is also set up between the UE and the IAB donor. The SRB 3 is set up between the IAB node and the IAB donor, which means that an RLC layer corresponding to the SRB 3 is located on the IAB node MT function unit and the IAB donor DU, and a PDCP layer corresponding to the SRB 3 is located on the IAB node MT function unit and the IAB donor CU. The SRB 3 is set up between the UE and the IAB donor, which means that an RLC layer corresponding to the SRB 3 is located on the UE and the IAB node DU, and a PDCP layer corresponding to the SRB 3 is located on the UE and the IAB donor CU. The SRB 3 between the IAB node and the IAB donor is used to transmit the NR RRC message of the IAB node MT function unit and the F1AP message of the IAB node DU. The SRB 3 between the UE and the IAB donor is used to transmit the NR RRC message of the UE.

Figure 2B:
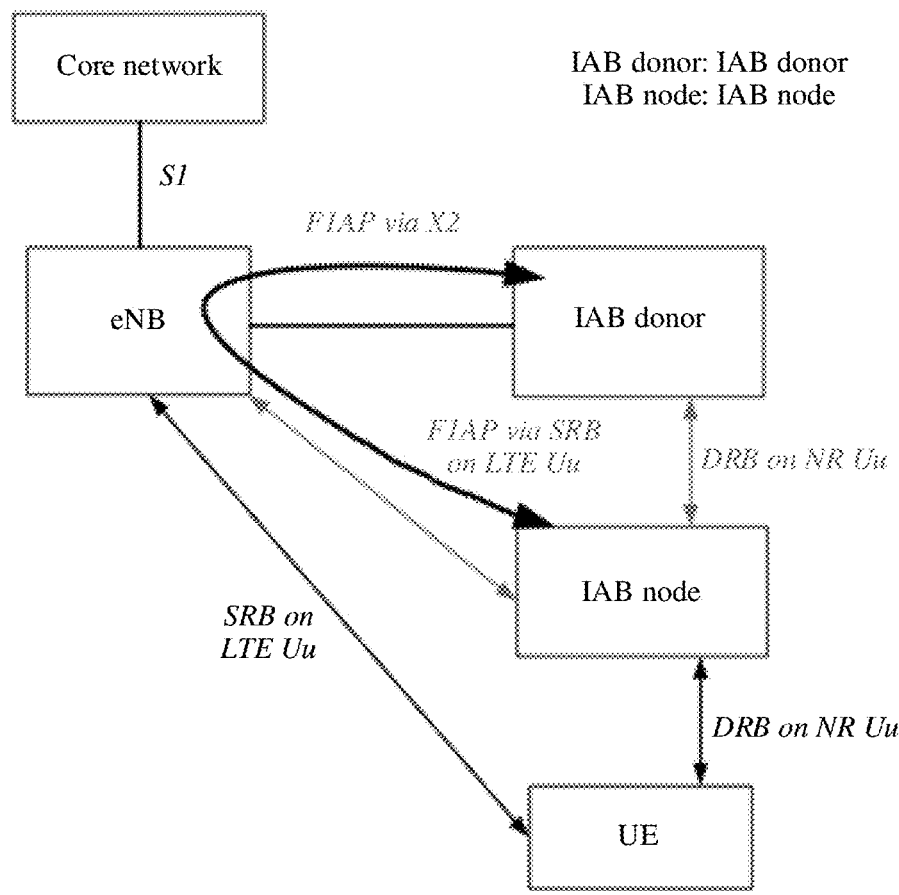
FIG. 2b is a schematic diagram of a second signaling transmission solution.

A second signaling transmission solution is shown in FIG. 2b: there is no SRB 3 between the IAB node and the IAB donor, and there is no SRB 3 between the UE and the IAB donor, either.

There is no SRB 3 but only a DRB between the IAB node and the IAB donor. Therefore, the NR RRC message of the IAB node MT function unit and the F1AP message of the IAB node DU need to be forwarded to the IAB donor CU via the LTE eNB. Downlink transmission is used as an example. The IAB donor CU generates an NR RRC message, encapsulates the NR RRC message as an RRC container into an X2AP message, and sends the X2AP message to the LTE eNB. The LTE eNB encapsulates the RRC container into an LTE RRC message, and sends the LTE RRC message to the IAB node MT function unit. The IAB donor CU generates an F1AP message, encapsulates the F1AP message as a container into an X2AP message, and sends the X2AP message to the LTE eNB. The LTE eNB encapsulates the container into an LTE RRC message, and sends the LTE RRC message to the IAB node MT function unit. FIG. 2b shows a transmission path of the F1AP message.

There is no SRB 3 but only a DRB between the UE and the IAB donor. Therefore, the NR RRC message of the UE needs to be forwarded to the IAB donor CU via the LTE eNB. Downlink transmission is used as an example. The IAB donor CU encapsulates the NR RRC message of the UE as an RRC container into an X2AP message, and sends the X2AP message to the LTE eNB. The LTE eNB encapsulates the RRC container into an LTE RRC message, and sends the LTE RRC message to the UE.

Figure 2C:
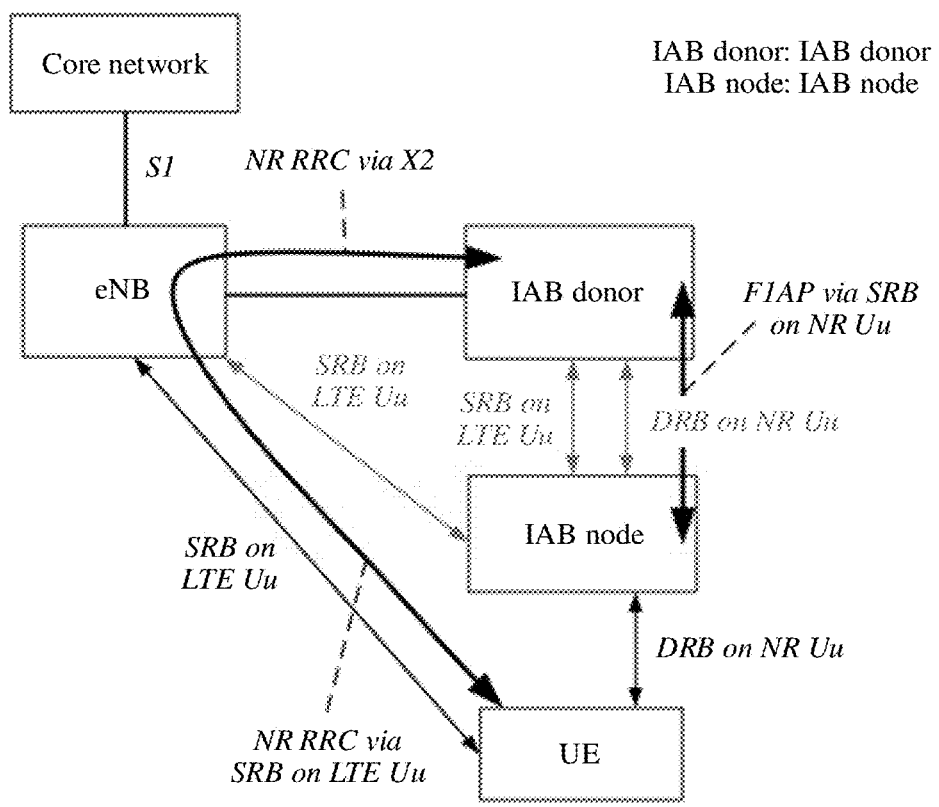
FIG. 2c is a schematic diagram of a third signaling transmission solution.

A third signaling transmission solution is shown in FIG. 2c: an SRB 3 is set up between the IAB node and the IAB donor, and there is no SRB 3 between the UE and the IAB donor. The SRB 3 is set up between the IAB node and the IAB donor. Therefore, the NR RRC message of the IAB node MT function unit and the F1AP message of the IAB node DU can be transmitted directly. There is no SRB 3 but only a DRB between the UE and the IAB donor. Therefore, the NR RRC message of the UE needs to be forwarded to the IAB donor CU via the LTE eNB. Downlink transmission is used as an example. The IAB donor CU encapsulates the NR RRC message of the UE as an RRC container into an X2AP message, and sends the X2AP message to the LTE eNB. The LTE eNB encapsulates the RRC container into an LTE RRC message, and sends the LTE RRC message to the UE.

Although the three signaling transmission solutions shown in FIG. 2a to FIG. 2c are proposed, in these three signaling transmission solutions, a solution to transmission of the F1AP message between the IAB node DU and the IAB donor CU is not provided. In view of this, the embodiments provide a communication method and apparatus, to specify the solution to the transmission of the F1AP message between the IAB node DU and the IAB donor CU and ensure the transmission of the F1AP message.

Figure 3:
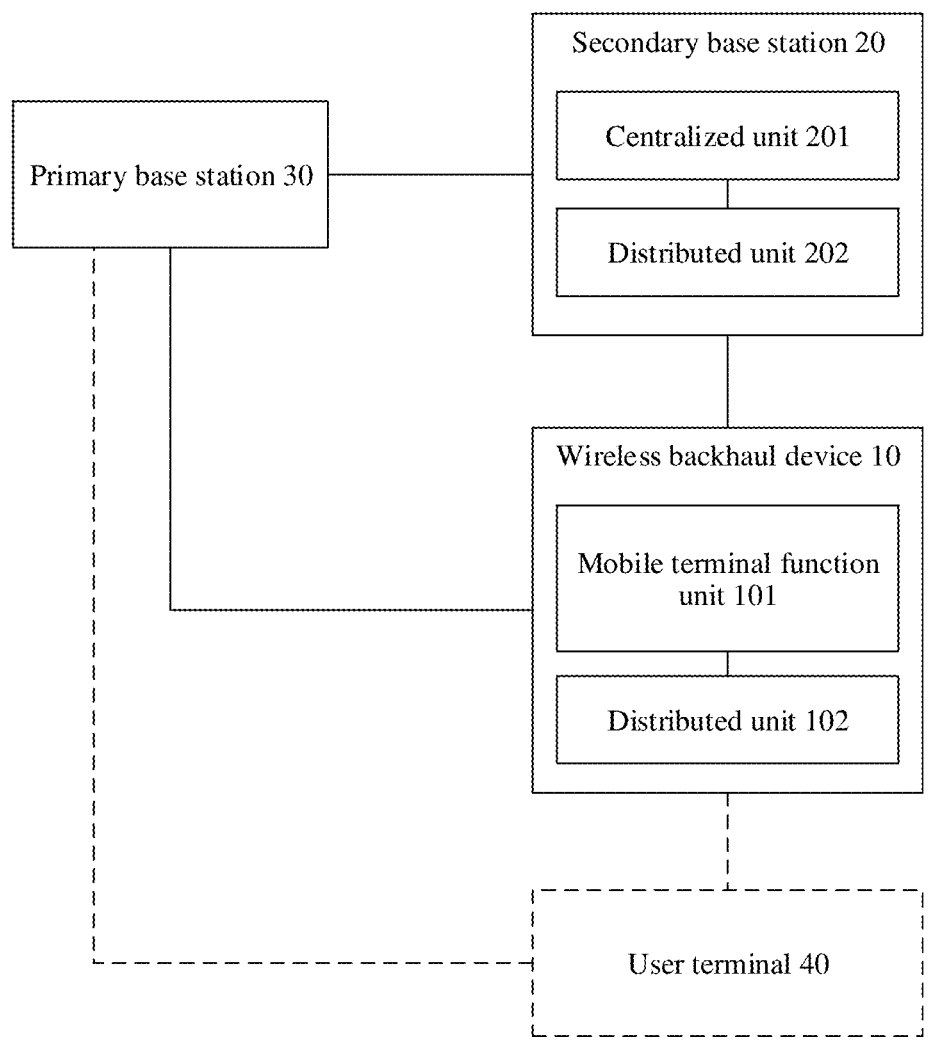
FIG. 3 is a schematic diagram of a network architecture to which an embodiment is applied.

FIG. 3 is a schematic diagram of a network architecture to which the embodiments is applied. A two-hop data backhaul scenario is used as an example in this embodiment. The network architecture includes a wireless backhaul device 10, a secondary base station 20 of the wireless backhaul device, and a primary base station 30 of the wireless backhaul device. The solution in the embodiments is also applicable to a multi-hop data backhaul scenario, and details are not described in this patent.

The wireless backhaul device 10 includes a mobile terminal function unit 101 and a distributed unit 102. The wireless backhaul device 10 corresponds to the IAB node in FIG. 1, the mobile terminal function unit 101 corresponds to the IAB node MT function unit in FIG. 1, and the distributed unit 102 corresponds to the IAB node DU in FIG. 1.

The secondary base station 20 includes a centralized unit 201 and a distributed unit 202. The secondary base station 20 corresponds to the IAB donor in FIG. 1, the centralized unit 201 corresponds to the IAB donor CU in FIG. 1, and the distributed unit 202 corresponds to the IAB donor DU in FIG. 1.

The primary base station 30 corresponds to the LTE eNB in FIG. 1.

In an SA network deployment scenario, the secondary base station 20 is connected to a core network. Both a user terminal and an IAB node MT function unit work in the SA mode, and both the user terminal and the IAB node MT function unit can access the secondary base station 20.

In an NSA network deployment scenario, the primary base station 30 is connected to an LTE core network, and the secondary base station 20 is not connected to an LTE core network control plane entity. When the user terminal can work only in the NSA mode, an LTE eNB serves as a primary base station of the user terminal, and an IAB donor CU and an IAB node DU serve as a secondary base station. The IAB node MT function unit can work in the SA mode or in the NSA mode. If the IAB node MT function unit works in the SA mode, operations of the IAB node MT function unit are the same as those in the SA network deployment scenario. If the IAB node MT function unit works in the NSA mode, the LTE eNB serves as a primary base station of the IAB node MT function unit, and the IAB donor CU and an IAB donor DU serve as a secondary base station of the IAB node MT function unit.

The network architecture shown in FIG. 3 further includes a user terminal 40. The user terminal in the embodiments may include various devices with a wireless communication function, for example, a handheld device, a vehicle-mounted device, a wearable device, a computing device, or another processing device connected to a wireless modem; or may include UE, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, UE, a mobile station (MS), or a terminal device, relay user equipment. The relay user equipment may be, for example, a 5G residential gateway (RG). In the embodiments, an example in which the user terminal is UE is used for description.

It should be noted that, when the UE is used in an IAB scenario (where a two-hop data backhaul scenario is used as an example), a physical layer/MAC layer/RLC layer that is peer to the UE and that is on an NR Uu interface is located on the IAB node DU, and a PDCP layer/RRC layer or the like is located on the IAB donor CU.

The following describes the communication method provided in the embodiments in detail with reference to FIG. 4 to FIG. 10A and FIG. 10B.

Figure 4:
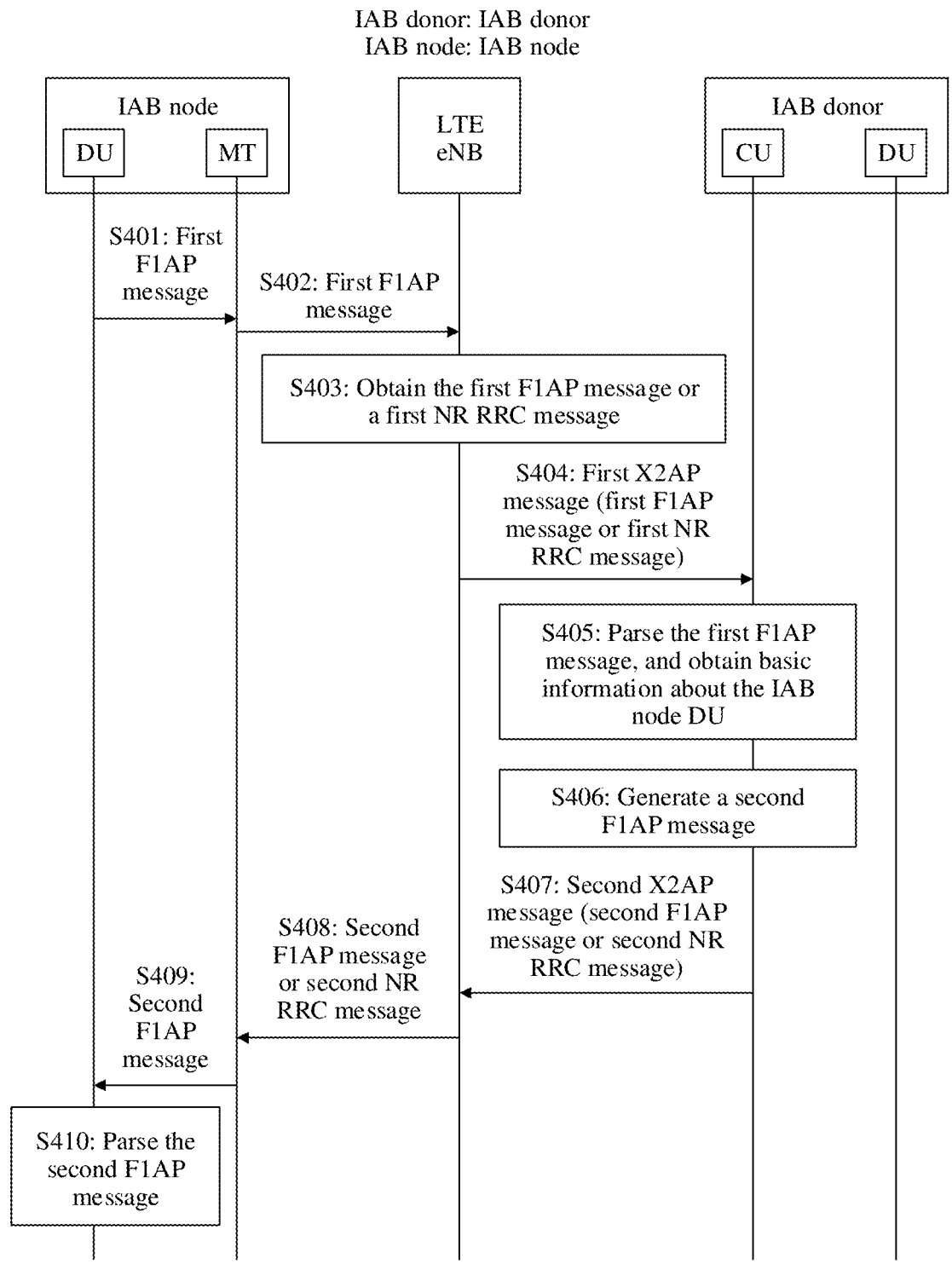
FIG. 4 is a schematic flowchart of a communication method according to a first Embodiment.

In an example, the embodiments are applied to the schematic diagram of the network architecture shown in FIG. 3. FIG. 4 is a schematic flowchart of a communication method according to Embodiment 1. In this embodiment, an F1AP message is transmitted through an LTE Uu interface and an X2 interface. That is, there is no SRB 3 between an IAB node and an IAB donor. The embodiment shown in FIG. 4 may include, but is not limited to, the following steps.

Step S401: An IAB node DU generates a first F1AP message, and sends the first F1AP message to an IAB node MT function unit through an internal interface of the IAB node. Correspondingly, the IAB node MT function unit receives the first F1AP message from the IAB node DU.

Optionally, the first F1AP message may be a UE-associated F1AP message, or may be a non-UE-associated F1AP message.

The non-UE-associated F1AP message is used as an example for description. After randomly accessing the IAB donor, the IAB node MT function unit enables a function of the IAB node DU and triggers setup of an F1 interface between the IAB node DU and an IAB donor CU. For a process in which the IAB node MT function unit randomly accesses the IAB donor, refer to an embodiment shown in FIG. 7. It may be understood that the embodiment shown in FIG. 4 is a possible implementation of setting up the F1 interface between the IAB node DU and the IAB donor CU.

The IAB node DU generates the first F1AP message. The first F1AP message may be an F1 setup request message, used to request to set up the F1 interface between the IAB node DU and the IAB donor CU. After generating the first F1AP message, the IAB node DU sends the first F1AP message to the IAB node MT function unit through the internal interface of the IAB node.

Step S402: The IAB node MT function unit maps the first F1AP message to a signaling-plane bearer of an LTE Uu interface and sends the first F1AP message to an LTE eNB via the signaling-plane bearer of the LTE Uu interface.

When receiving the first F1AP message from the IAB node DU, the IAB node MT function unit performs RRC message encapsulation and/or bearer mapping on the first F1AP message. For example, the following several processing manners may be included.

Manner a: The IAB node MT function unit encapsulates the first F1AP message into a first NR RRC message, encapsulates the first NR RRC message into a first LTE RRC message, and then maps the first LTE RRC message to the signaling-plane bearer of the LTE Uu interface. This manner involves encapsulation into an RRC message and mapping to a bearer. For example, the IAB node MT function unit uses the first F1AP message as a container/string, includes the container/string in the first NR RRC message, uses the first NR RRC message as an RRC container/string, encapsulates the RRC container/string into the first LTE RRC message, and then maps the first LTE RRC message to the signaling-plane bearer of the LTE Uu interface. Refer to an IAB node side in a schematic diagram of an interaction protocol stack architecture corresponding to the manner a shown in FIG. 5a. The IAB node MT function unit encapsulates an F1AP message into an NR RRC message, and then encapsulates the NR RRC message into an LTE RRC message.

The signaling-plane bearer of the LTE Uu interface may be an existing SRB 1 or SRB 2, or may be a newly defined SRB for transmitting the F1AP message. The newly defined SRB is a signaling-plane bearer between the IAB node MT function unit and the LTE eNB.

Optionally, to further differentiate between scheduling priorities of the UE-associated F1AP message and the non-UE-associated F1AP message, LTE RRC messages in which the UE-associated F1AP message and the non-UE-associated F1AP message are separately encapsulated may be mapped to different signaling-plane bearers of the LTE Uu interface. For example, an LTE RRC message in which the UE-associated F1AP message is encapsulated is mapped to a newly defined SRB x, and an LTE RRC message in which the non-UE-associated F1AP message is encapsulated is mapped to a newly defined SRB y. The SRB x and the SRB y are signaling-plane bearers between the IAB node MT function unit and the LTE eNB. Before mapping the first LTE RRC message to the SRB x or SRB y of the LTE Uu interface, the IAB node MT function unit still needs to obtain one piece of indication information that is used to indicate a type of the F1AP message (which is the UE-associated F1AP or the non-UE-associated F1AP) encapsulated in the first LTE RRC message, so that the IAB node MT function unit maps different types of F1AP messages to different signaling-plane bearers of the LTE Uu interface. The indication information may be one piece of indication information that is sent by the IAB node DU through the internal interface.

Optionally, the first NR RRC message further includes first indication information, where the first indication information is used to indicate that the first NR RRC message includes the F1AP message, that is, used to indicate that a message type carried in the first NR RRC message is the F1AP message. The first indication information may be indicated by using an information element (IE). For example, an enumerated type is used to explicitly indicate whether the first NR RRC message includes the F1AP message; or a Boolean type is used, where a value 0 indicates that the first NR RRC message does not include the F1AP message, and a value 1 indicates that the first NR RRC message includes the F1AP message. A specific indication manner is not limited in this embodiment.

Optionally, the first LTE RRC message further includes second indication information, where the second indication information is used to indicate that the first LTE RRC message includes the NR RRC message, that is, used to indicate that a message type carried in the first NR RRC message is the NR RRC message. The second indication information is similar to the first indication information.

Manner b: The IAB node MT function unit directly encapsulates the first F1AP message into a first LTE RRC message, and then maps the first LTE RRC message to the signaling-plane bearer of the LTE Uu interface. This manner involves encapsulation into an RRC message and mapping to a bearer. For example, the IAB node MT function unit uses the first F1AP message as a container/string, includes the container/string in the first LTE RRC message, and then maps the first LTE RRC message to the signaling-plane bearer of the LTE Uu interface. Refer to an IAB node side in a schematic diagram of an interaction protocol stack architecture corresponding to the manner b shown in FIG. 5b. The IAB node MT function unit encapsulates an F1AP message into an LTE RRC message.

Similar to that in the manner a, the signaling-plane bearer of the LTE Uu interface may be an existing SRB 1 or SRB 2, or may be a newly defined SRB for transmitting the F1AP message. The newly set-up SRB is a signaling-plane bearer between the IAB node MT function unit and the LTE eNB.

Optionally, to further differentiate between scheduling priorities of the UE-associated F1AP message and the non-UE-associated F1AP message, LTE RRC messages in which the UE-associated F1AP message and the non-UE-associated F1AP message are separately encapsulated may be mapped to different signaling-plane bearers of the LTE Uu interface. For example, an LTE RRC message in which the UE-associated F1AP message is encapsulated is mapped to a newly defined SRB x, and an LTE RRC message in which the non-UE-associated F1AP message is encapsulated is mapped to a newly defined SRB y. The SRB x and the SRB y are signaling-plane bearers between the IAB node MT function unit and the LTE eNB. Before mapping the first LTE RRC message to the SRB x or SRB y of the LTE Uu interface, the IAB node MT function unit still needs to obtain one piece of indication information that is used to indicate a type of the F1AP message (which is the UE-associated F1AP or the non-UE-associated F1AP) encapsulated in the first LTE RRC message, so that the IAB node MT function unit maps different types of F1AP messages to different signaling-plane bearers of the LTE Uu interface. The indication information may be one piece of indication information that is sent by the IAB node DU through the internal interface.

Optionally, the first LTE RRC message further includes third indication information, where the third indication information is used to indicate that the first LTE RRC message includes the F1AP message. The third indication information is similar to the first indication information.

Manner c: The IAB node MT function unit encapsulates the first F1AP message into a first NR RRC message, and then maps the first NR RRC message to the signaling-plane bearer of the LTE Uu interface. For example, the IAB node MT function unit uses the first F1AP message as a container/string, encapsulates the container/string into the first NR RRC message, and then maps the first NR RRC message to the signaling-plane bearer of the LTE Uu interface, and to a PDCP entity corresponding to the signaling-plane bearer of the LTE Uu interface. The PDCP entity processes the first NR RRC message. For example, the PDCP entity performs security processing, for example, encryption and/or integrity protection, on the first NR RRC message.

Similar to that in the manner a, the PDCP entity corresponding to the signaling-plane bearer of the LTE Uu interface may be a PDCP entity corresponding to the existing SRB 1 or SRB 2, or may be a PDCP entity corresponding to a newly defined SRB for transmitting the F1AP message. Optionally, to further differentiate between scheduling priorities of the UE-associated F1AP message and the non-UE-associated F1AP message, NR RRC messages in which the UE-associated F1AP message and the non-UE-associated F1AP message are separately encapsulated may be mapped to different signaling-plane bearers of the LTE Uu interface. For example, an NR RRC message in which the UE-associated F1AP message is encapsulated is mapped to a PDCP entity corresponding to a newly defined SRB x, and an NR RRC message in which the non-UE-associated F1AP message is encapsulated is mapped to a PDCP entity corresponding to a newly defined SRB y. The SRB x and the SRB y are signaling-plane bearers between the IAB node MT function unit and the LTE eNB. Before mapping the first NR RRC message to the PDCP entity corresponding to the SRB x or SRB y of the LTE Uu interface, the IAB node MT function unit still needs to obtain one piece of indication information that is used to indicate a type of the F1AP message (which is the UE-associated F1AP or the non-UE-associated F1AP) encapsulated in the first NR RRC message, so that the IAB node MT function unit maps different types of F1AP messages to PDCP entities corresponding to different signaling-plane bearers of the LTE Uu interface. The indication information may be one piece of indication information that is sent by the IAB node DU through the internal interface.

Figure 5A:
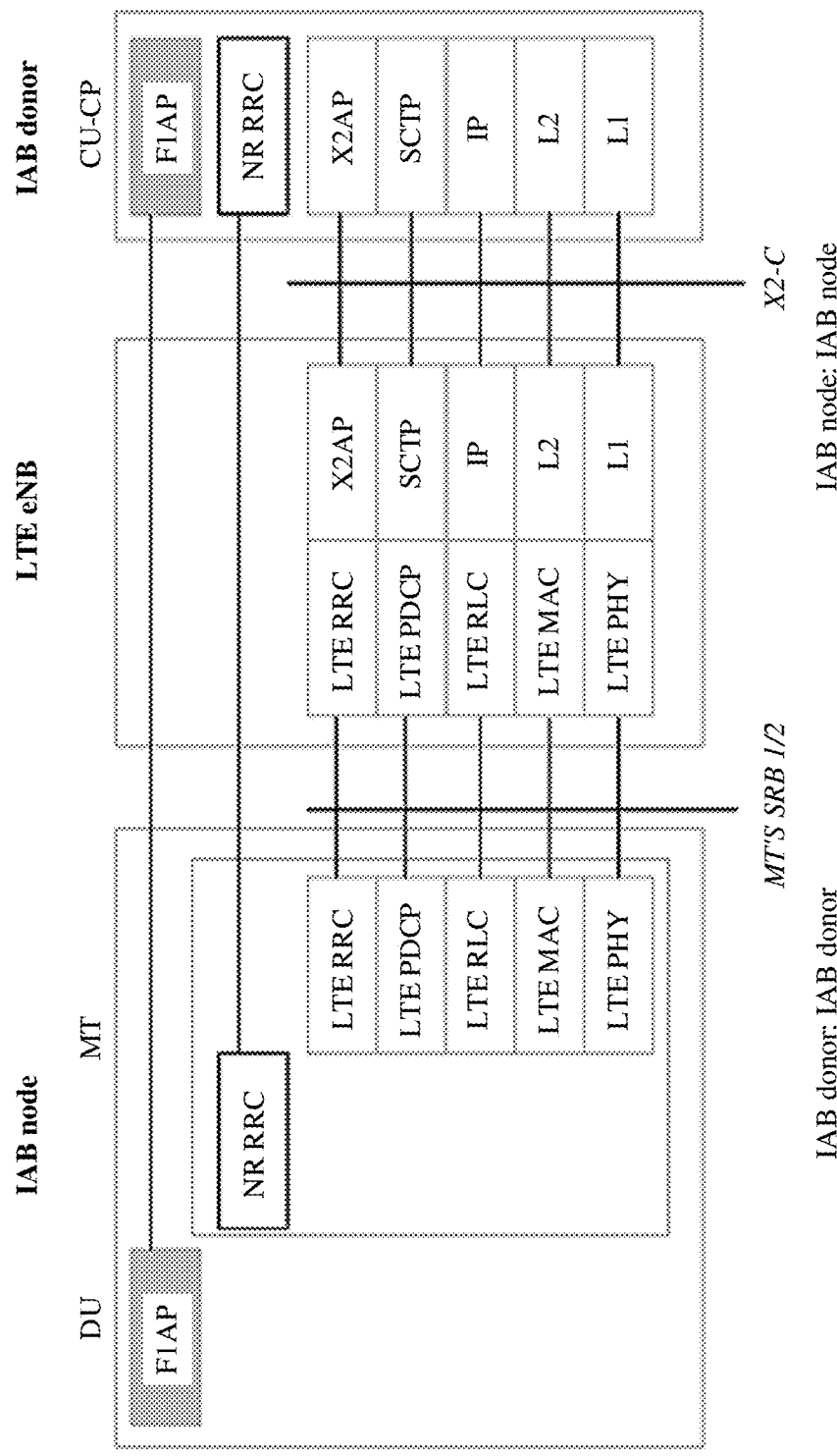
FIG. 5a is a schematic diagram of an interactive protocol stack architecture corresponding to Manner a according to a first Embodiment.
Figure 5B:
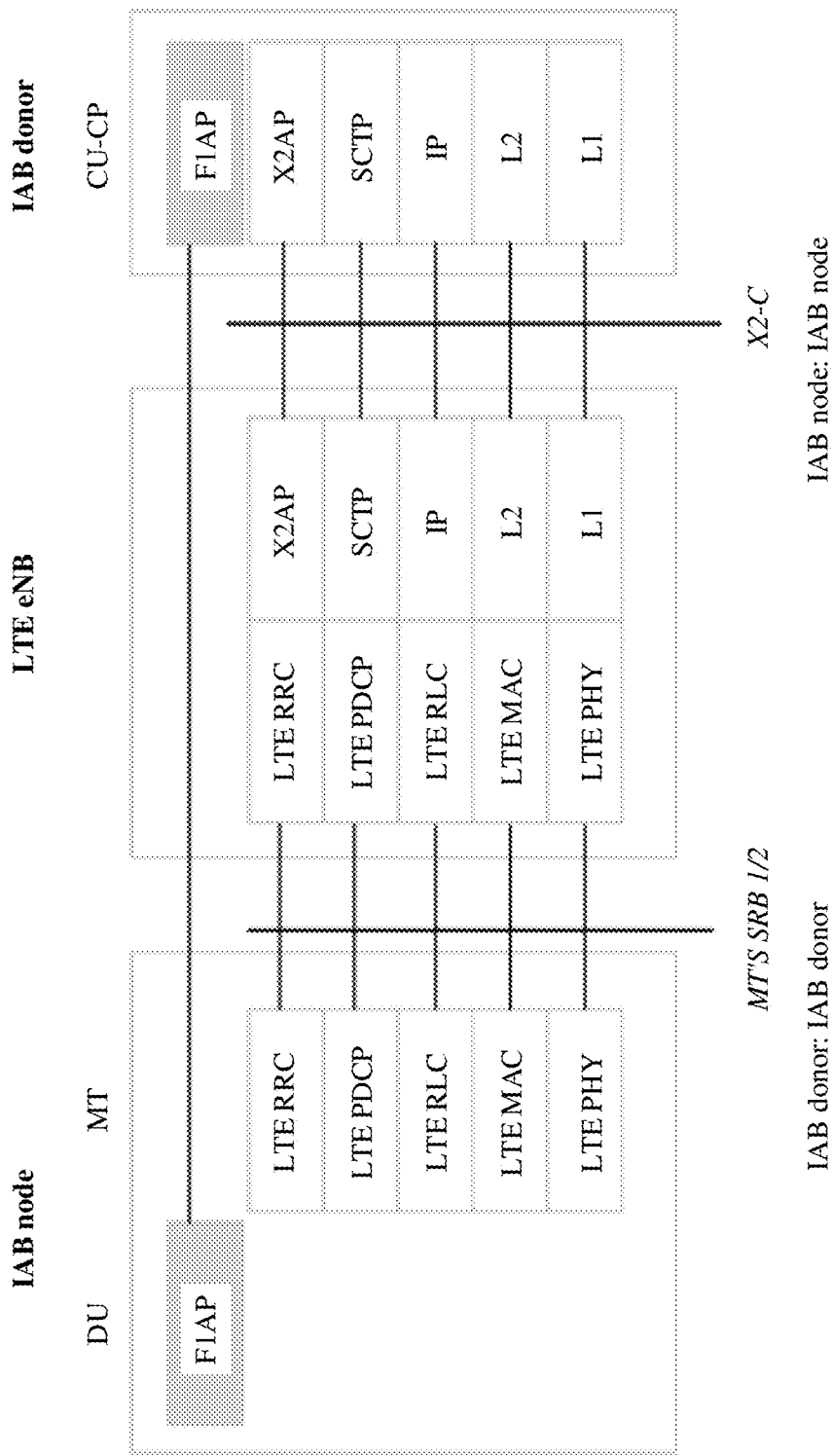
FIG. 5b is a schematic diagram of an interactive protocol stack architecture corresponding to Manner b according to a first Embodiment.
Figure 5C:
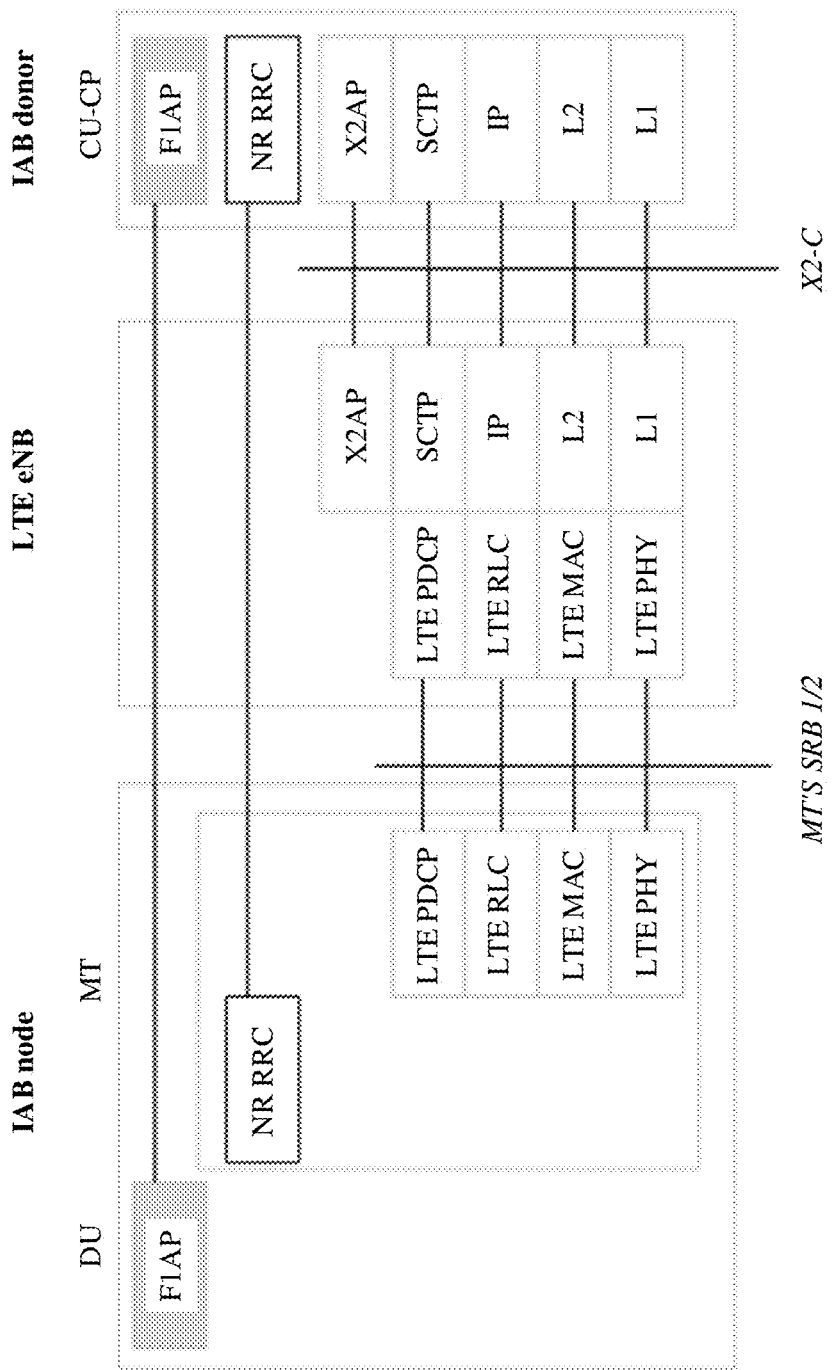
FIG. 5c is a schematic diagram of an interactive protocol stack architecture corresponding to Manner c according to a first Embodiment.
Figure 5D:
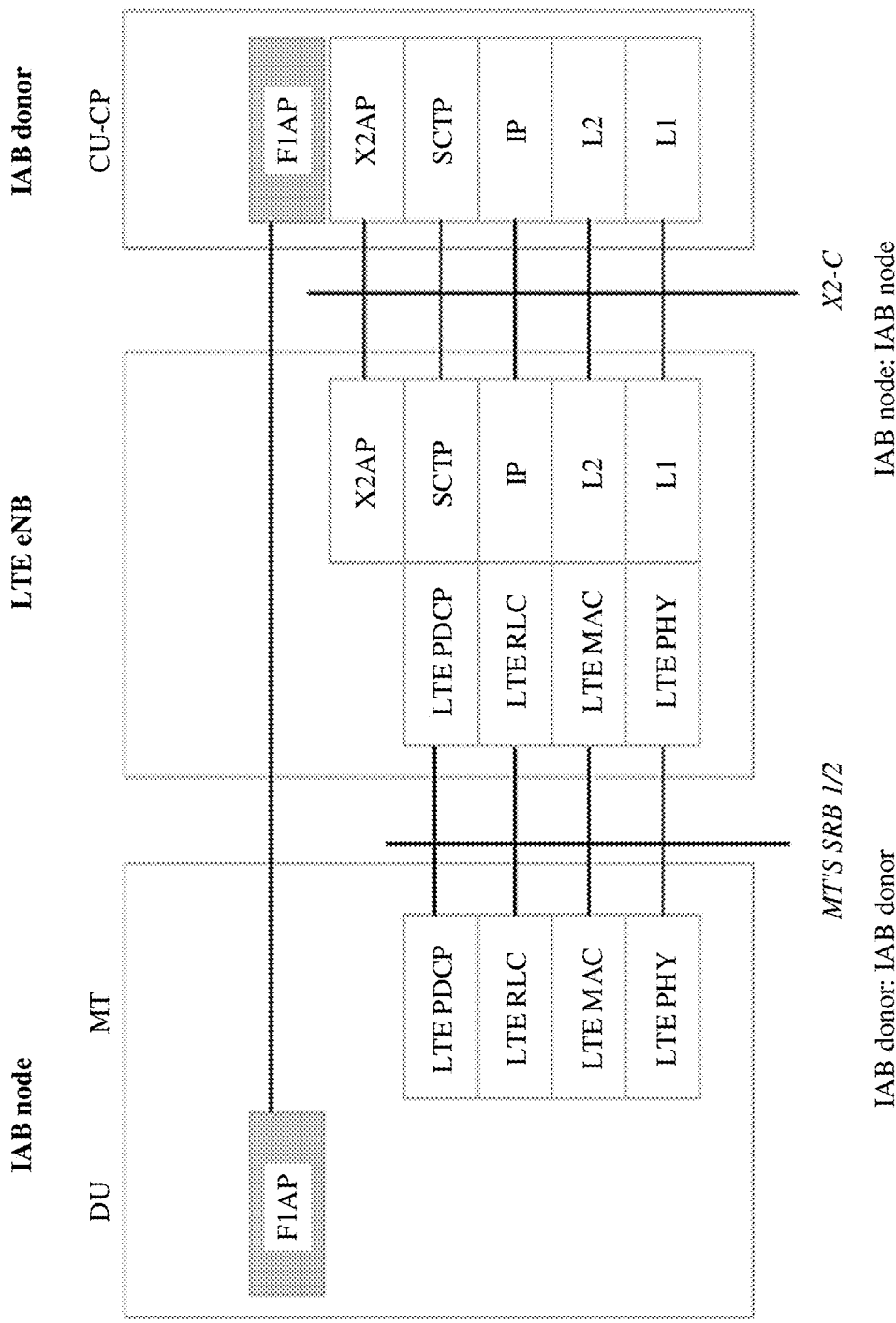
FIG. 5d is a schematic diagram of an interactive protocol stack architecture corresponding to Manner d according to a first Embodiment.

Refer to an IAB node side in a schematic diagram of an interaction protocol stack architecture corresponding to the manner c shown in FIG. 5c. There is no LTE RRC layer. Therefore, the IAB node MT function unit encapsulates an F1AP message into an NR RRC message, and then maps the NR RRC message at an LTE PDCP layer for processing at the PDCP layer.

Optionally, the first NR RRC message further includes fourth indication information, where the fourth indication information is used to indicate that the first NR RRC message includes the F1AP message. The fourth indication information is similar to the first indication information.

In the manner c, a message included at the LTE PDCP layer is an NR RRC message. In this case, a header field of a PDCP layer corresponding to the signaling-plane bearer of the LTE Uu interface includes fifth indication information. The fifth indication information is used to indicate that a message included at the PDCP layer is an NR RRC message. A function of the PDCP layer is implemented by a PDCP entity, that is, implemented by the PDCP entity corresponding to the signaling-plane bearer of the LTE Uu interface. Optionally, if an NR PDCP protocol is used between the IAB node MT function unit and the LTE eNB, the header field of the PDCP layer does not need to include the fifth indication information. Instead, it is determined, according to the PDCP protocol used between the IAB node MT function unit and the LTE eNB, whether the message included at the PDCP layer is an NR RRC message or an LTE RRC message. For example, if the NR PDCP protocol is used between the IAB node MT function unit and the LTE eNB, the message included at the PDCP layer is the NR RRC message.

Manner d: The IAB node MT function unit directly maps the first F1AP message to the signaling-plane bearer of the LTE Uu interface, and to a PDCP entity corresponding to the signaling-plane bearer of the LTE Uu interface, and the PDCP entity processes the first F1AP message. For example, the IAB node MT function unit uses the first F1AP message as a container/string, and then maps the first F1AP message to the PDCP entity corresponding to the signaling-plane bearer of the LTE Uu interface, and the PDCP entity processes the first F1AP message.

Similar to that in the manner a, the PDCP entity corresponding to the signaling-plane bearer of the LTE Uu interface may be a PDCP entity corresponding to the existing SRB 1 or SRB 2, or may be a PDCP entity corresponding to a newly defined SRB for transmitting the F1AP message.

Optionally, to further differentiate between scheduling priorities of the UE-associated F1AP message and the non-UE-associated F1AP message, the UE-associated F1AP message and the non-UE-associated F1AP message are further separately mapped to different signaling-plane bearers of the LTE Uu interface. For example, the UE-associated F1AP message is mapped to a PDCP entity corresponding to a newly defined SRB x, and the non-UE-associated F1AP message is mapped to a PDCP entity corresponding to a newly defined SRB y. The SRB x and the SRB y are signaling-plane bearers between the IAB node MT function unit and the LTE eNB. Before mapping the first F1AP message to the PDCP entity corresponding to the SRB x or SRB y of the LTE Uu interface, the IAB node MT function unit still needs to obtain one piece of indication information that is used to indicate a type of the first F1AP message (which is the UE-associated F1AP or the non-UE-associated F1AP), so that the IAB node MT function unit maps different types of F1AP messages to PDCP entities corresponding to different signaling-plane bearers of the LTE Uu interface. The indication information may be one piece of indication information that is sent by the IAB node DU through the internal interface. Refer to an IAB node side in a schematic diagram of an interaction protocol stack architecture corresponding to the manner d shown in FIG. 5d. There is no LTE RRC layer. Therefore, the IAB node MT function unit maps the F1AP message at an LTE PDCP layer for processing at the PDCP layer.

In the manner d, a message included at the LTE PDCP layer is an F1AP message. In this case, a header field of a PDCP layer corresponding to the signaling-plane bearer of the LTE Uu interface includes sixth indication information. The sixth indication information is used to indicate that the message included at the PDCP layer is the F1AP message.

In the manner c and the manner d, indication information used to indicate whether the message included at the PDCP layer is the NR RRC message or the F1AP message may be indicated by using one bit. For example, when the bit is "1", it indicates that the message included at the PDCP layer is the NR RRC message; or when the bit is "0", it indicates that the message included at the PDCP layer is the F1AP message. Alternatively, the two cases may be separately indicated by using two bits. For example, one bit is used to indicate that the message included at the PDCP layer is the NR RRC message, and the other bit is used to indicate that the message included at the PDCP layer is the F1AP message. Optionally, a type of the F1AP message (which is the UE-associated F1AP or the non-UE-associated F1AP) may be further indicated in the header field of the PDCP layer.

In the foregoing several manners, the first NR RRC message is a first RRC message of a first standard, and may be an existing uplink (UL) information transfer message, or may be a newly defined RRC message; and the first LTE RRC message is a first RRC message of a second standard, and may be an existing UL information transfer message, or may be a newly defined RRC message.

In the manners a and b, the IAB node MT function unit sends the first LTE RRC message to the LTE eNB. Refer to FIG. 5a and FIG. 5b. The IAB node MT function unit directly sends the processed first LTE RRC message to the LTE eNB by performing processing by using an LTE PDCP layer, an LTE RLC layer, an LTE MAC layer, and an LTE physical layer that correspond to the signaling-plane bearer of the LTE Uu interface.

In the manner c, the IAB node MT function unit sends, by using an RLC layer, a MAC layer, and a physical layer that correspond to the signaling-plane bearer of the LTE Uu interface, the first NR RRC message processed by the PDCP entity to the LTE eNB. For example, the first NR RRC message processed by the PDCP entity is sequentially processed by the RLC layer, the MAC layer, and the physical layer and sent to the LTE eNB. For example, the RLC layer performs processing of segmentation, connection, and retransmission, the MAC layer performs processing of retransmission, and the physical layer performs processing of coding and modulation. The processed first NR RRC message is then sent to the LTE eNB.

In the manner d, the IAB node MT function unit sends, by using an RLC layer, a MAC layer, and a physical layer that correspond to the signaling-plane bearer of the LTE Uu interface, the first F1AP message processed by the PDCP entity to the LTE eNB. For example, the first F1AP message processed by the PDCP entity is sequentially processed by the RLC layer, the MAC layer, and the physical layer and sent to the LTE eNB.

Step S403: The LTE eNB obtains the first F1AP message, and encapsulates the first F1AP message into a first X2AP message. Alternatively, the LTE eNB obtains the first NR RRC message, and encapsulates the first NR RRC message into a first X2AP message, where the first NR RRC message includes the first F1AP message.

For the manner a, the LTE eNB extracts the container/string in the first NR RRC message from the LTE RRC message, includes the container/string in a newly defined inter-node RRC message, and then encapsulates the inter-node RRC message into the first X2AP message. Alternatively, the LTE eNB extracts the container/string in the first NR RRC message from the LTE RRC message, and directly encapsulates the container/string into the first X2AP message. Optionally, the LTE eNB may extract the container/string in the first NR RRC message from the LTE RRC message based on the second indication information. Refer to an LTE eNB side in FIG. 5a.

For the manner b, the LTE eNB extracts the container/string in the first F1AP message from the LTE RRC message, includes the container/string in a newly defined inter-node RRC message, and then encapsulates the inter-node RRC message into the first X2AP message. Alternatively, the LTE eNB extracts the container/string in the first F1AP message from the LTE RRC message, and directly encapsulates the container/string into the first X2AP message. Optionally, the LTE eNB may extract the container/string in the first F1AP message from the LTE RRC message based on the third indication information. Refer to an LTE eNB side in FIG. 5b.

For the manner c, the LTE eNB extracts the container/string in the first NR RRC message from the LTE PDCP layer, includes the container/string in a newly defined inter-node RRC message, and then encapsulates the inter-node RRC message into the first X2AP message. Alternatively, the LTE eNB extracts the container/string in the first NR RRC message from the LTE PDCP layer, and directly encapsulates the container/string into the first X2AP message. Refer to an LTE eNB side in FIG. 5c.

For the manner d, the LTE eNB extracts the container/string in the first F1AP message from the LTE PDCP layer, includes the container/string in a newly defined inter-node RRC message, and then encapsulates the inter-node RRC message into the first X2AP message. Alternatively, the LTE eNB extracts the container/string in the first F1AP message from the LTE RRC layer, and directly encapsulates the container/string into the first X2AP message. Refer to an LTE eNB side in FIG. 5d.

The first X2AP message may be an RRC transfer message, or may be a newly defined X2AP message.

Optionally, the first X2AP message may include seventh indication information, where the seventh indication information is used to indicate that the first X2AP message carries the F1AP message. Optionally, the first X2AP message may include eighth indication information, where the eighth indication information is used to indicate that the first X2AP message carries the NR RRC message.

Step S404: The LTE eNB sends the first X2AP message to the IAB donor CU. Correspondingly, the IAB donor CU receives the first X2AP message from the LTE eNB.

The LTE eNB sends the first X2AP message to the IAB donor CU through an X2-C interface. The X2-C interface is an interface between the LTE eNB and the IAB donor CU.

Step S405: The IAB donor CU parses the first F1AP message.

When receiving the first X2AP message, the IAB donor CU extracts the first F1AP message from the first X2AP message and parses the first F1AP message. If the first F1AP message is an F1 interface setup request message, the IAB donor CU may obtain basic information about the IAB node DU by parsing the first F1AP message. The basic information about the IAB node DU may include information such as an IAB node DU identity (ID), a physical cell identifier (PCI), and a cell global identifier (CGI).

When obtaining the basic information about the IAB node DU, the IAB donor CU may store a correspondence between the basic information about the IAB node DU and an X2 interface identifier of the IAB node MT function unit.

The X2 interface identifier of the IAB node MT function unit is an X2AP ID of the IAB node MT function unit, and may be a CU UE X2AP ID and/or an eNB UE X2AP ID. The CU UE X2AP ID is allocated by the IAB donor CU to the IAB node MT function unit, and is used to uniquely identify the IAB node MT function unit on the X2 interface between the IAB donor CU and the LTE eNB. The eNB UE X2AP ID is allocated by the LTE eNB to the IAB node MT function unit, and is used to uniquely identify the IAB node MT function unit on the X2 interface between the LTE eNB and the IAB donor CU. In other words, the X2 interface identifier of the IAB node MT function unit is used to uniquely identify the IAB node MT function unit on the X2 interface. The correspondence between the basic information about the IAB node DU and the X2 interface identifier of the IAB node MT function unit is stored, so that based on the correspondence, the IAB donor CU may determine the corresponding IAB node MT function unit based on the IAB node DU, or may determine the corresponding IAB node DU based on the IAB node MT function unit. In this way, the IAB donor CU may determine to which IAB node MT function unit or to which IAB node DU the F1AP message generated by the IAB donor CU is sent.

Step S406: The IAB donor CU generates a second F1AP message, and encapsulates the second F1AP message into a second X2AP message.

The IAB donor CU generates the second F1AP message. If the first F1AP message is an F1 setup request message, the second F1AP message is an F1 setup response message, used to respond to the F1 setup request message. After generating the second F1AP message, the IAB donor CU encapsulates the second F1AP message into the second X2AP message.

For the manner a and the manner c, the IAB donor CU uses the second F1AP message as a container/string, encapsulates the container/string into a second NR RRC message, then uses the second NR RRC message as a container/string, and encapsulates the container/string into the second X2AP message. Alternatively, the IAB donor CU uses the second NR RRC message as a container/string, includes the container/string in a newly defined inter-node RRC message, and then encapsulates the inter-node RRC message into the second X2AP message. Refer to IAB donor sides in FIG. 5a and FIG. 5c.

Optionally, the second X2AP message further includes eighth indication information, where the eighth indication information is used to indicate that the second X2AP message includes the NR RRC message. The second NR RRC message includes indication information, where the indication information is used to indicate that the second NR RRC message includes the F1AP message.

For the manner b and the manner d, the IAB donor CU uses the second F1AP message as a container/string, and encapsulates the container/string into the second X2AP message. Alternatively, the IAB donor CU uses the second F1AP message as a container/string, includes the container/string in a newly defined inter-node RRC message, and then encapsulates the inter-node RRC message into the second X2AP message. Refer to IAB donor sides in FIG. 5b and FIG. 5d.

Optionally, the second X2AP message includes seventh indication information, where the seventh indication information is used to indicate that the second X2AP message includes the F1AP message.

Step S407: The IAB donor CU sends the second X2AP message to the LTE eNB. Correspondingly, the LTE eNB receives the second X2AP message from the IAB donor CU.

That the IAB donor CU sends the second X2AP message to the LTE eNB through an X2-C interface is similar to that the LTE eNB sends the first X2AP message to the IAB donor CU.

Step S408: The LTE eNB obtains the second F1AP message, maps the second F1AP message to the signaling-plane bearer of the LTE Uu interface, and sends the second F1AP message to the IAB node MT function unit via the signaling-plane bearer of the LTE Uu interface. Alternatively, the LTE eNB obtains the second NR RRC message, maps the second NR RRC message to the signaling-plane bearer of the LTE Uu interface, and sends the second NR RRC message to the IAB node MT function unit via the signaling-plane bearer of the LTE Uu interface.

For the manner a, the LTE eNB obtains a second NR RRC container/string from the second X2AP message, encapsulates the container/string into a second LTE RRC message, and then maps the second LTE RRC message to the signaling-plane bearer of the LTE Uu interface. Optionally, the LTE learns, based on the eighth indication information, that the container/string is the NR RRC message. The second LTE RRC message includes second indication information, where the second indication information is used to indicate that the second LTE RRC message includes the NR RRC message, that is, a message type included in the second LTE RRC message is the NR RRC message. The second NR RRC message includes first indication information, where the first indication information is used to indicate that the second NR RRC message includes the F1AP message.

For the manner b, the LTE eNB obtains a second F1AP container from the second X2AP message, encapsulates the container/string into a second LTE RRC message, and then maps the second LTE RRC message to the signaling-plane bearer of the LTE Uu interface. Optionally, the LTE eNB learns, based on the seventh indication information, that the container/string is the F1AP message. The second LTE RRC message includes third indication information, where the third indication information is used to indicate that the container/string carried in the second LTE RRC message is the F1AP message.

For the manner c, the LTE eNB obtains a second NR RRC container from the second X2AP message, and then maps the container/string to a PDCP entity corresponding to the signaling-plane bearer of the LTE Uu interface, and the PDCP entity processes the second NR RRC message. In this manner, the LTE eNB needs to include one piece of indication information in a header field of an LTE PDCP layer, where the indication information is used to indicate that a message included at the LTE PDCP layer is the NR RRC message.

For the manner d, the LTE eNB obtains a container/string from the second X2AP message, learns, based on the third indication information, that the container/string carries the F1AP message, and then maps the container/string to a PDCP entity corresponding to the signaling-plane bearer of the LTE Uu interface, and the PDCP entity processes the second F1AP message. In this manner, the LTE eNB needs to include one piece of indication information in a header field of an LTE PDCP layer, where the indication information is used to indicate that a message included at the LTE PDCP layer is the F1AP message.

In the foregoing several manners, the second LTE RRC message is a second RRC message of the second standard, and may be an existing DL information transfer message, or may be a newly defined RRC message. The second NR RRC message is a second RRC message of the first standard.

In a possible implementation, the LTE eNB obtains identification information that is of the IAB node MT function unit and that corresponds to the second F1AP message, so that the LTE eNB determines to which IAB node MT function unit the processed second F1AP message is sent. The LTE eNB stores a correspondence between an eNB UE X2AP ID and a cell radio network temporary identifier (C-RNTI) 1. The eNB UE X2AP ID is used to uniquely identify the IAB node MT function unit on the X2 interface of the LTE eNB. The C-RNTI 1 is used to uniquely identify an IAB node MT function unit on the LTE Uu interface of the LTE eNB. The second X2AP message sent by the IAB donor CU to the LTE eNB may carry the eNB UE X2AP ID, so that the LTE eNB determines, based on the correspondence, to which IAB node MT function unit the processed second F1AP message is sent. In this embodiment, a C-RNTI used to uniquely identify the IAB node MT function unit on the LTE Uu interface of the LTE eNB is denoted as the C-RNTI 1.

For the manner a and the manner b, the LTE eNB may directly send the second LTE RRC message to the IAB node MT function unit by using an LTE RRC layer, an LTE PDCP layer, an LTE RLC layer, an LTE MAC layer, and an LTE physical layer.

For the manner c, the LTE eNB processes the second NR RRC message by using a PDCP layer, an RLC layer, a MAC layer, and a physical layer that correspond to the IAB node MT function unit, and then sends the processed second NR RRC message to the IAB node MT function unit. The PDCP layer, the RLC layer, the MAC layer, and the physical layer that correspond to the IAB node MT function unit are a PDCP layer, an RLC layer, a MAC layer, and a physical layer that correspond to the signaling-plane bearer of the LTE Uu interface.

For the manner d, the LTE eNB processes the second F1AP message by using the PDCP layer, the RLC layer, the MAC layer, and the physical layer that correspond to the IAB node MT function unit, and then sends the processed second F1AP message to the IAB node MT function unit.

Step S409: The IAB node MT function unit obtains the second F1AP message, and sends the second F1AP message to the IAB node DU through the internal interface of the IAB node. Correspondingly, the IAB node DU receives the second F1AP message from the IAB node MT function unit.

Optionally, for the manner a, the IAB node MT function unit extracts the second NR RRC message from the second LTE RRC message based on the second indication information, and then extracts the second F1AP message from the second NR RRC message based on the first indication information.

Optionally, for the manner b, the IAB node MT function unit extracts the second F1AP message from the second LTE RRC message based on the third indication information.

Optionally, for the manner c, the IAB node MT function unit extracts the second NR RRC message from an LTE SRB 1/2 based on the indication information included in the header field of the LTE PDCP layer and parses the second NR RRC message based on the first indication information to extract the second F1AP message.

Optionally, for the manner d, the IAB node MT function unit extracts the second F1AP message from an LTE SRB 1/2 based on the indication information included in the header field of the LTE PDCP layer.

When obtaining the second F1AP message, the IAB node MT function unit sends the second F1AP message to the IAB node DU through the internal interface of the IAB node.

Step S410: The IAB node DU parses the second F1AP message.

When receiving the second F1AP message from the IAB node MT function unit, the IAB node DU parses the second F1AP message. For example, the second F1AP message is the F1 setup response message.

When the first F1AP message is the F1 setup request message, and the second F1AP message is the F1 setup response message, according to the embodiment shown in FIG. 4, an F1 interface may be set up between the IAB donor CU and the IAB node DU. In addition, a processing manner and a transmission path for the F1AP message are specified to ensure transmission of the F1AP message between the IAB node DU and the IAB donor CU.

It may be understood that, in the embodiment shown in FIG. 4, the IAB node works in the NSA mode, and there is no SRB 3 between the IAB node and the IAB donor.

Figure 6:
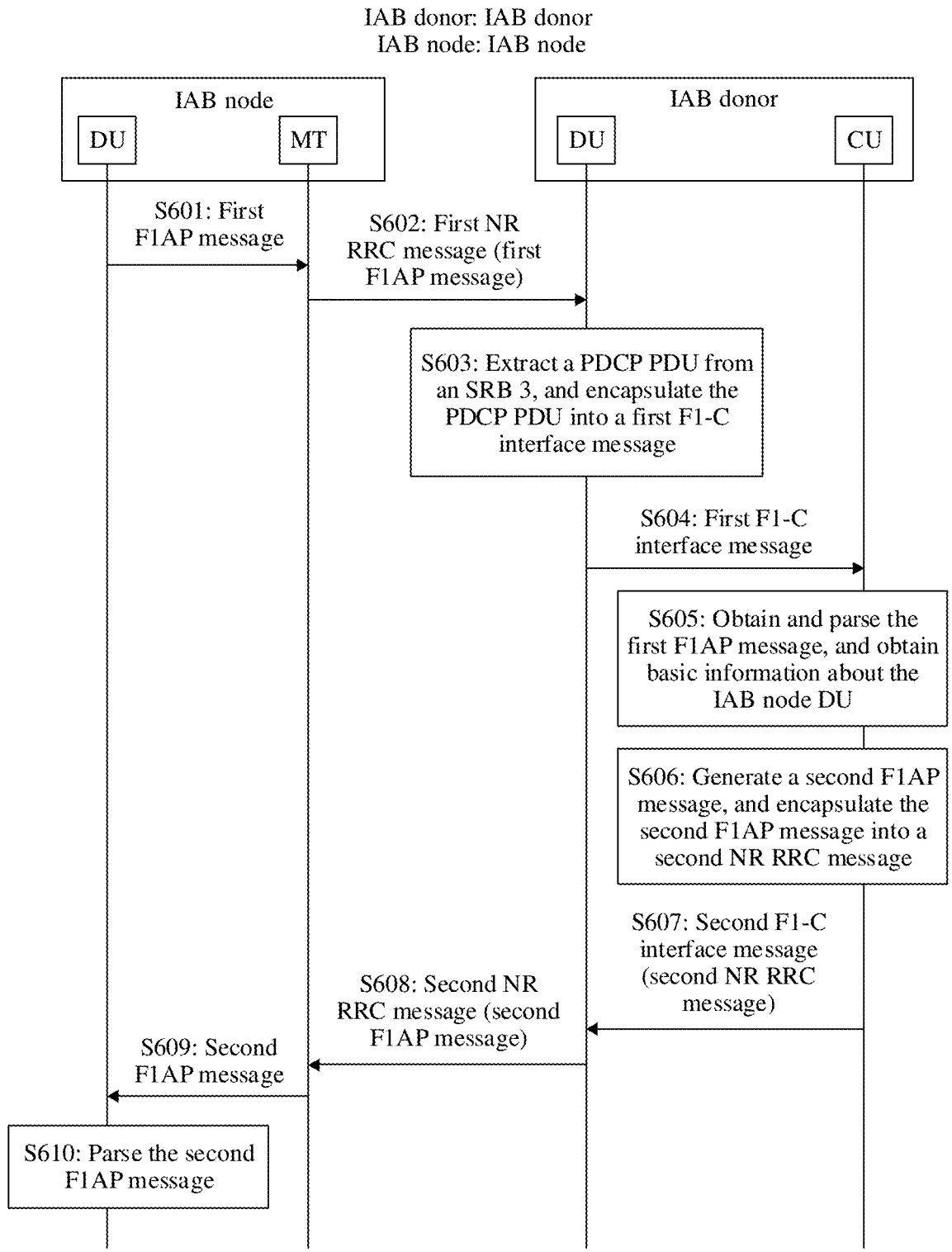
FIG. 6 is a schematic flowchart of a communication method according to a second Embodiment.
Figure 7:
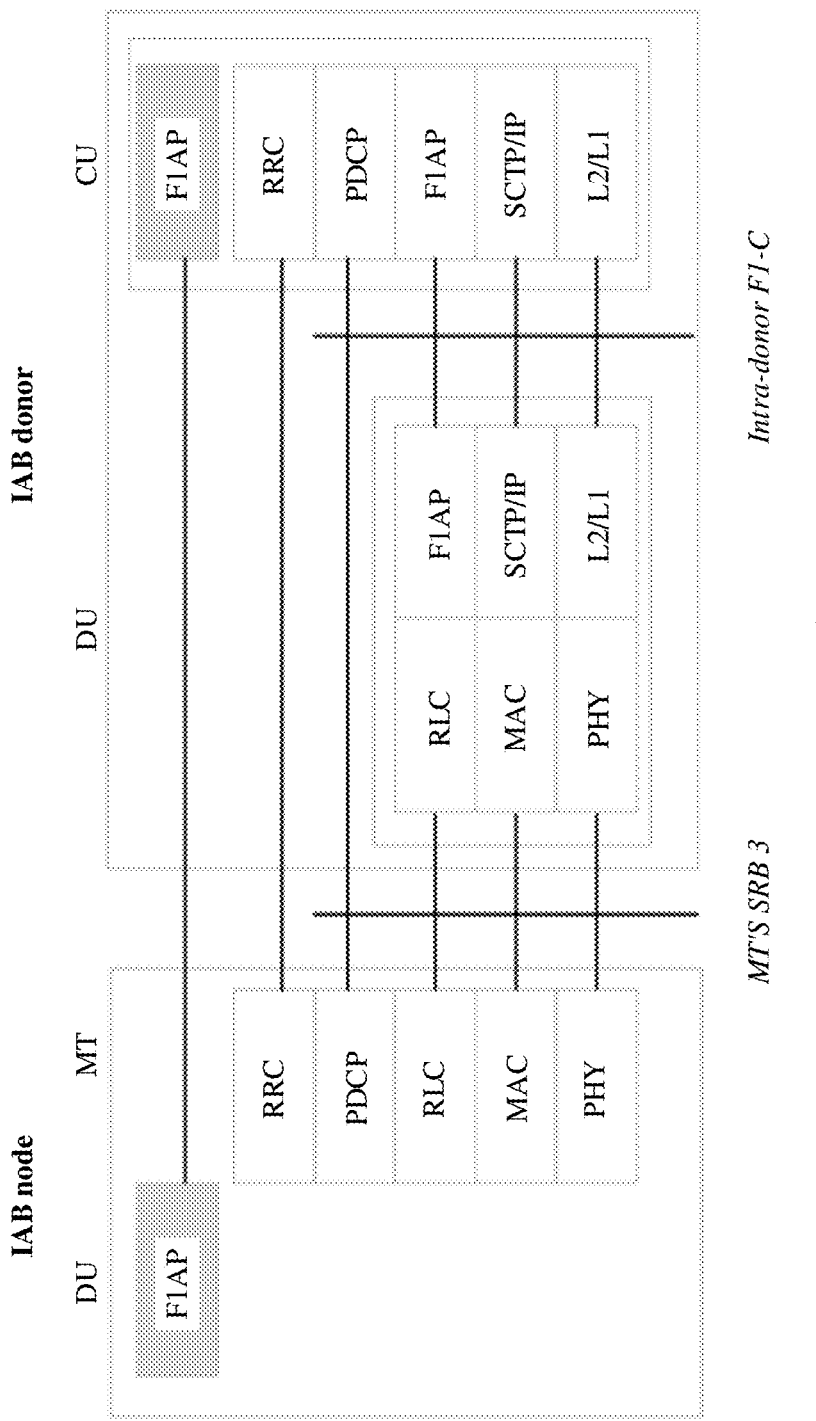
FIG. 7 is a schematic diagram of an interactive protocol architecture according to a second Embodiment.

For example, the embodiments are applied to the schematic diagram of the network architecture shown in FIG. 3. FIG. 6 is a schematic flowchart of a communication method according to Embodiment 2. In this embodiment, an F1AP message is transmitted via a signaling-plane bearer of an NR Uu interface. That is, there is an SRB 3 between an IAB node and an IAB donor. The embodiment shown in FIG. 6 may include, but is not limited to, the following steps:

Step S601: An IAB node DU generates a first F1AP message, and sends the first F1AP message to an IAB node MT function unit through an internal interface of the IAB node. Correspondingly, the IAB node MT function unit receives the first F1AP message from the IAB node DU.

For an implementation process of step S601, refer to specific descriptions in step S401 in the embodiment shown in FIG. 4. Details are not described herein again.

Step S602: The IAB node MT function unit encapsulates the first F1AP message into a first NR RRC message, maps the first NR RRC message to the signaling-plane bearer of the NR Uu interface, and sends the first NR RRC message to an IAB donor DU via the signaling-plane bearer of the NR Uu interface.

For example, the IAB node MT function unit uses the first F1AP message as a container/string, encapsulates the container/string in the first NR RRC message, and then maps the first NR RRC message to the signaling-plane bearer of the NR Uu interface.

The first NR RRC message may be a UL information transfer message, or may be a newly defined RRC message. Optionally, the first NR RRC message includes first indication information, where the first indication information is used to indicate that the first NR RRC message includes an F1AP message.

The signaling-plane bearer of the NR Uu interface may be an existing SRB 3, or may be a newly defined SRB for transmitting the F1AP message. The newly defined SRB is a signaling-plane bearer between the IAB node MT function unit and the IAB donor DU.

Optionally, to further differentiate between scheduling priorities of a UE-associated F1AP message and a non-UE-associated F1AP message, the UE-associated F1AP message and the non-UE-associated F1AP message are further separately mapped to different signaling-plane bearers of the NR Uu interface. For example, the UE-associated F1AP message is mapped to a newly defined SRB x, and the non-UE-associated F1AP message is mapped to a newly defined SRB y. The SRB x and the SRB y are signaling-plane bearers between the IAB node MT function unit and the IAB donor CU. Before mapping the first F1AP message to the SRB x or SRB y of the NR Uu interface, the IAB node MT function unit still needs to obtain one piece of indication information that is used to indicate a type of the first F1AP message (which is the UE-associated F1AP or the non-UE-associated F1AP), so that the IAB node MT function unit maps different types of F1AP messages to different signaling-plane bearers of the NR Uu interface. The indication information may be one piece of indication information that is sent by the IAB node DU through the internal interface.

For example, the IAB node MT function unit sends the first NR RRC message to the IAB donor DU via the SRB 3. Refer to a schematic diagram of an interaction protocol architecture shown in FIG. 7. On an IAB node side, the IAB node MT function unit encapsulates the F1AP message into an NR RRC message, and then sends the NR RRC message to the IAB donor DU via the SRB 3.

Step S603: The IAB donor DU extracts a PDCP protocol data unit (PDU) from the SRB 3, and encapsulates the PDCP protocol data unit into a first F1-C interface message.

The PDCP PDU includes the first NR RRC message. Because the PDCP PDU is encapsulated into the first F1-C interface message, the first F1-C interface message includes the first NR RRC message.

The F1-C interface message is a message between the IAB donor DU and the IAB donor CU. The first F1-C interface message may be an existing UL RRC information (message) transfer message, or may be a newly defined F1AP message, but the newly defined F1AP message needs to carry type indication information of the SRB 3, so that the IAB donor CU sends data extracted from the first F1-C interface message to a PDCP layer corresponding to the SRB 3 for processing. The type indication information of the SRB 3 is used to indicate that an RRC message carried in the newly defined F1AP message is sent via the SRB 3 of the NR Uu interface.

The IAB donor DU includes an F1 interface identifier of the IAB node MT function unit in the first F1-C interface message based on a correspondence that is between an NR Uu interface identifier C-RNTI 2 and an F1 interface identifier DU UE F1AP ID and that is stored in a process in which the IAB node MT function unit accesses the IAB donor. The F1 interface identifier of the IAB node MT function unit may include the DU UE F1AP ID and/or a CU UE F1AP ID. The DU UE F1AP ID is allocated by the IAB donor DU and is used to uniquely identify the IAB node MT function unit on an F1 interface between the IAB donor DU and the IAB donor CU. The CU UE F1AP ID is allocated by the IAB donor CU and is used to uniquely identify the IAB node MT function unit on the F1 interface between the IAB donor CU and the IAB donor DU. In other words, the F1 interface identifier of the IAB node MT function unit is used to uniquely identify the IAB node MT function unit on the F1 interface. In this embodiment, a C-RNTI used to uniquely identify the IAB node MT function unit on an NR Uu interface of the IAB donor is denoted as the C-RNTI 2.

Step S604: The IAB donor DU sends the first F1-C interface message to the IAB donor CU. Correspondingly, the IAB donor CU receives the first F1-C interface message from the IAB donor DU.

Step S605: The IAB donor CU obtains and parses the first F1AP message.

For example, the IAB donor CU extracts the PDCP PDU from the first F1-C interface message, transfers the PDCP PDU to a corresponding PDCP layer for processing, sends the PDCP PDU to an RRC layer for processing, and then extracts the first F1AP message from the first NR RRC message based on the first indication information. The IAB donor CU parses the first F1AP message. If the first F1AP message is an F1 interface setup request message, the IAB donor CU may obtain basic information, for example, an IAB node DU ID and a PCI, about the IAB node DU by parsing the first F1AP message.

When obtaining the basic information about the IAB node DU, the IAB donor CU stores a correspondence between the basic information about the IAB node DU and the F1 interface identifier of the IAB node MT function unit, so that based on the correspondence, the IAB donor CU may determine the corresponding IAB node MT function unit based on the IAB node DU, or may determine the corresponding IAB node DU based on the IAB node MT function unit. In this way, the IAB donor CU may determine to which IAB node MT function unit or to which IAB node DU an F1AP message generated by the IAB donor CU is sent.

Step S606: The IAB donor CU generates a second F1AP message, and encapsulates the second F1AP message into a second NR RRC message.

The IAB donor CU generates the second F1AP message. If the first F1AP message is an F1 setup request message, the second F1AP message is an F1 setup response message, used to respond to the F1 setup request message. After generating the second F1AP message, the IAB donor CU encapsulates the second F1AP message into the second NR RRC message.

Optionally, the second NR RRC message includes second indication information, where the second indication information is used to indicate that the second NR RRC message includes the F1AP message.

Step S607: The IAB donor CU sends a second F1-C interface message to the IAB donor DU. Correspondingly, the IAB donor DU receives the second F1-C interface message from the IAB donor CU.

The second F1-C interface message includes the second NR RRC message. The second F1-C interface message may be an existing DL RRC message transfer message, or may be a newly defined F1AP message, but the newly defined F1AP message needs to carry type indication information of the SRB 3, so that the IAB donor DU maps data obtained from a second F1-C interface to the SRB 3 and sends the data to the IAB node MT function unit.

The IAB donor CU includes the F1 interface identifier of the IAB node MT function unit in the second F1-C interface message based on the stored correspondence between the basic information about the IAB node DU and the F1 interface identifier of the IAB node MT function unit, that is, includes the CU UE F1AP ID and/or the DU UE F1AP ID.

Step S608: The IAB donor DU sends the second NR RRC message to the IAB node MT function unit. Correspondingly, the IAB node MT function unit receives the second NR RRC message from the IAB donor DU.

For example, the IAB donor DU extracts the second NR RRC message from the second F1-C interface message, and sends the second NR RRC message to the IAB node MT function unit based on SRB 3 type indication information carried in the second F1-C interface message by using an air interface resource corresponding to the SRB 3.

Step S609: The IAB node MT function unit obtains the second F1AP message, and sends the second F1AP message to the IAB node DU through the internal interface of the IAB node. Correspondingly, the IAB node DU receives the second F1AP message from the IAB node MT function unit.

For example, the IAB node MT function unit extracts the second NR RRC message from the SRB 3, extracts the second F1AP message from the second NR RRC message, and sends the second F1AP message to the IAB node DU through the internal interface of the IAB node.

Step S610: The IAB node DU parses the second F1AP message.

When receiving the second F1AP message from the IAB node MT function unit, the IAB node DU parses the second F1AP message. For example, the second F1AP message is the F1 setup response message.

When the first F1AP message is the F1 setup request message, and the second F1AP message is the F1 setup response message, according to the embodiment shown in FIG. 6, an F1 interface may be set up. In addition, a processing manner and a transmission path for the F1AP message are specified to ensure transmission of the F1AP message between the IAB node DU and the IAB donor CU.

It may be understood that, in the embodiment shown in FIG. 6, the IAB node works in the NSA mode, and there is an SRB 3 between the IAB node and the IAB donor.

In the embodiment shown in FIG. 6, the IAB node MT function unit encapsulates the first F1AP message into the first NR RRC message, and then sends the first NR RRC message to the IAB donor DU via the SRB 3. In addition to this processing manner of encapsulation, the IAB node MT function unit may further perform mapping on the first F1AP message. The mapping manner is also applicable to a scenario in which the IAB node works in the NSA mode and there is the SRB 3 between the IAB node and the IAB donor. An embodiment corresponding to the mapping manner may include the following steps:

Step S601: An IAB node DU generates a first F1AP message and sends the first F1AP message to an IAB node MT function unit through an internal interface of an IAB node. Correspondingly, the IAB node MT function unit receives the first F1AP message from the IAB node DU.

Step S602: The IAB node MT function unit maps the first F1AP message to a signaling-plane bearer of an NR Uu interface, and sends the first F1AP message to an IAB donor DU via the signaling-plane bearer of the NR Uu interface.

For example, the IAB node MT function unit maps the first F1AP message to a PDCP entity corresponding to the signaling-plane bearer of the NR Uu interface, and the PDCP entity processes the first F1AP message.

The IAB node MT function unit includes one piece of indication information in a header field of a PDCP layer, where the indication information is used to indicate that a message included at the PDCP layer is an F1AP message.

The IAB node MT function unit processes the first F1AP message by using the PDCP layer, an RLC layer, a MAC layer, and a physical layer that correspond to the signaling-plane bearer of the NR Uu interface, and then sends the processed first F1AP message to the IAB donor DU.

Step S603: The IAB donor DU extracts a PDCP PDU from an SRB 3, and encapsulates the PDCP PDU into a first F1-C interface message.

The first F1-C interface message carries type indication information of the SRB 3.

Step S604: The IAB donor DU sends the first F1-C interface message to the IAB donor CU. Correspondingly, the IAB donor CU receives the first F1-C interface message from the IAB donor DU.

Step S605: The IAB donor CU processes the first F1AP message.

For example, the IAB donor CU extracts the PDCP PDU from the first F1-C interface message, transfers, based on the type indication information of the SRB 3 carried in the first F1-C interface message, the PDCP PDU to a PDCP entity corresponding to the SRB 3 for processing, learns, based on the indication information carried in the header field of the PDCP layer, that the PDCP layer carries the F1AP message, and transfers the PDCP PDU to an F1AP layer for processing.

Step S606: The IAB donor CU generates a second F1AP message, and maps the second F1AP message to the PDCP entity corresponding to the SRB 3, and the PDCP entity processes the second F1AP message, and then encapsulates the processed second F1AP message into a second F1-C interface message.

When processing the second F1AP message, the PDCP entity includes one piece of indication information in the header field of the PDCP layer, where the indication information is used to indicate that a message included at the PDCP layer is the F1AP message.

The second F1-C interface message carries the type indication information of the SRB 3.

Step S607: The IAB donor CU sends the second F1-C interface message to the IAB donor DU. Correspondingly, the IAB donor DU receives the second F1-C interface message from the IAB donor CU.

Step S608: The IAB donor DU processes the second F1AP message.

The IAB donor DU extracts the PDCP PDU from the second F1-C interface message, and transfers, based on the type indication information of the SRB 3 carried in the second F1-C interface message, the PDCP PDU to an RLC entity corresponding to the SRB 3 for processing.

Step S609: The IAB donor DU sends the processed second F1AP message to the IAB node MT function unit. Correspondingly, the IAB node MT function unit receives the processed second F1AP message from the IAB donor DU.

The IAB donor DU processes, by using the RLC layer, the MAC layer, and the physical layer of the IAB node MT function unit, the second F1AP message processed by using the PDCP entity, and then sends the processed second F1AP message to the IAB node MT function unit.

Step S610: The IAB node MT function unit obtains the second F1AP message.

The IAB node MT function unit extracts the second F1AP message from the PDCP entity corresponding to the signaling-plane bearer of the Uu interface, learns, based on the indication information carried in the header field of the PDCP layer, that the SRB 3 carries the F1AP message, and then sends the second F1AP message to the IAB node DU through the internal interface for parsing.

Figure 8:
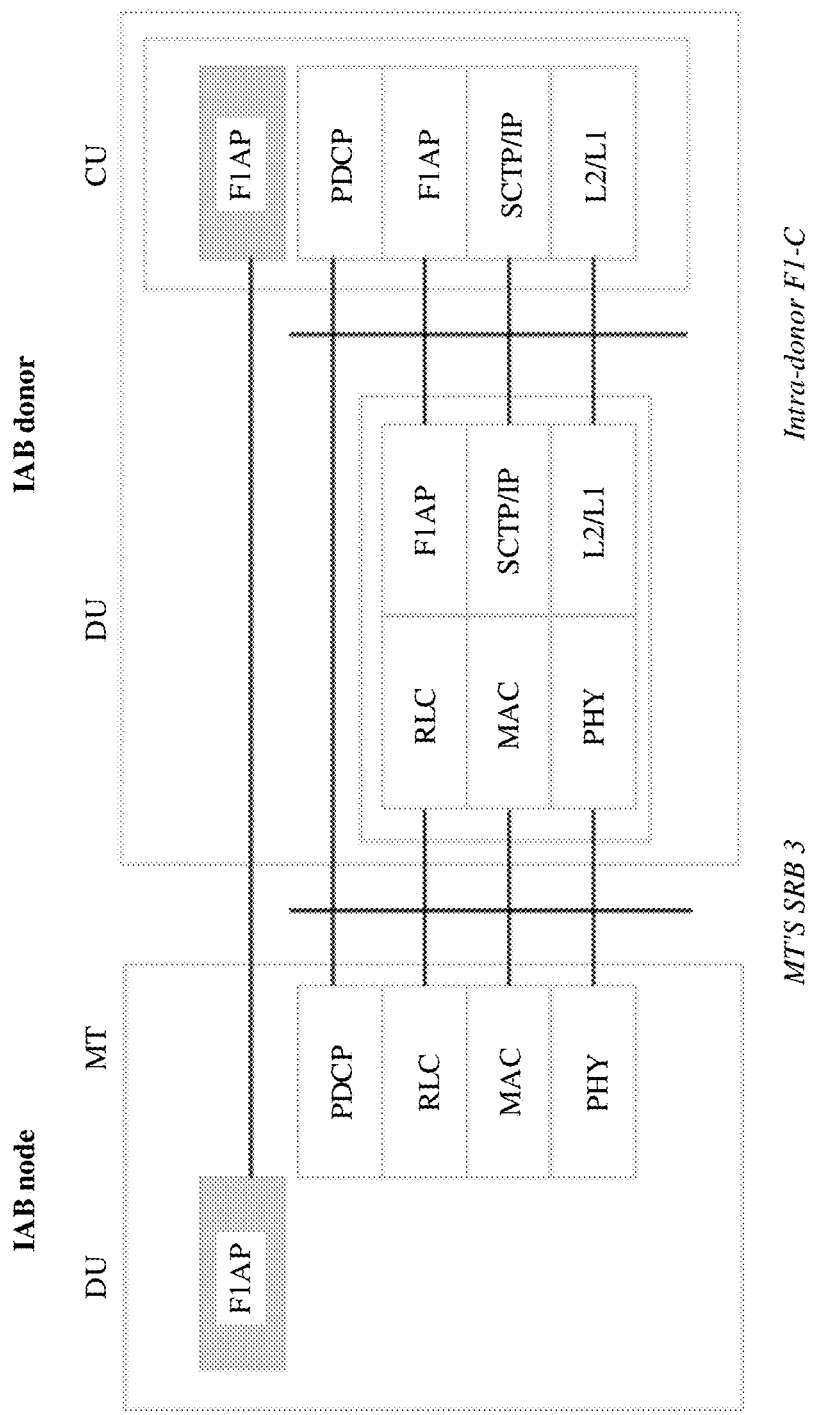
FIG. 8 is a schematic diagram of another interactive protocol architecture according to a second Embodiment.

For a schematic diagram of an interaction protocol architecture corresponding to step S601 to step S610, refer to FIG. 8. In FIG. 8, an internal (intra-donor) interface between the IAB donor DU and the IAB donor CU is an F1-C interface.

The F1AP message in the embodiments shown in FIG. 4 and FIG. 6 may be a UE-associated F1AP message, or may be a non-UE-associated F1AP message.

Figure 9:
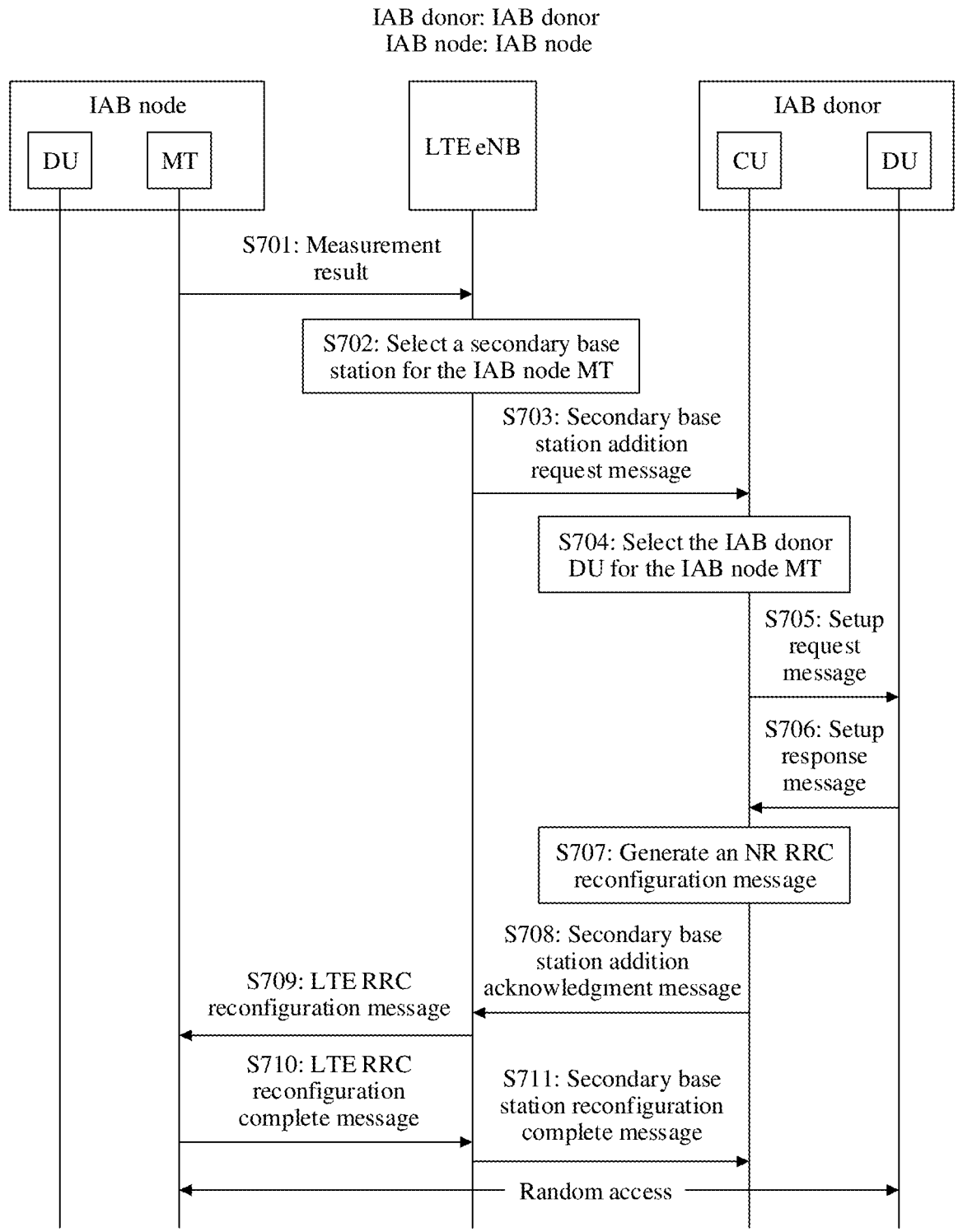
FIG. 9 is a schematic flowchart of a communication method according to a third Embodiment.

For example, the embodiments are applied to the network architecture shown in the schematic diagram of FIG. 3. FIG. 9 is a schematic flowchart of a communication method according to Embodiment 3. This embodiment is a procedure in which an IAB node MT function unit randomly accesses an IAB donor, and the procedure is performed before the embodiments shown in FIG. 4 and FIG. 6. The embodiment shown in FIG. 9 may include, but is not limited to, the following steps:

Step S701: The IAB node MT function unit reports a measurement result to an LTE eNB.

As a UE module, the IAB node MT function unit measures, as UE does, a base station in a neighboring cell based on measurement configuration information delivered by the LTE eNB, and reports the measurement result to the LTE eNB. The measurement result may include a reference signal received power (RSRP), a received signal strength indicator (RSSI), a reference signal received quality (RSRQ), and a signal to interference plus noise ratio (SINR) of each base station.

Step S702: The LTE eNB selects a secondary base station for the IAB node MT function unit based on the measurement result.

The LTE eNB selects the secondary base station for the IAB node MT function unit based on the measurement result, for example, selects an IAB donor as the secondary base station of the IAB node MT function unit. In this embodiment, an example in which the secondary base station of the IAB node MT function unit is the IAB donor is used for description.

Step S703: The LTE eNB sends a secondary base station addition request message to an IAB donor CU. Correspondingly, the IAB donor CU receives the secondary base station addition request message from the LTE eNB.

The secondary base station addition request message includes an eNB UE X2AP ID allocated by the LTE eNB to the IAB node MT function unit. The eNB UE X2AP ID is used to uniquely identify the IAB node MT function unit on an X2 interface of the LTE eNB. In this embodiment, the eNB UE X2AP ID is used as an X2 interface identifier of the IAB node MT function unit.

The secondary base station addition request message further includes IAB node indication information. The IAB node indication information is used to indicate that an IAB node is about to access the IAB donor, so that the IAB donor identifies the IAB node that is about to perform access.

After allocating the eNB UE X2AP ID, the LTE eNB may store a correspondence between the eNB UE X2AP ID and a C-RNTI 1, that is, the C-RNTI 1 is in a one-to-one correspondence with the eNB UE X2AP ID. The C-RNTI 1 is used to uniquely identify the IAB node MT function unit on an LTE Uu interface of the LTE eNB.

Step S704: The IAB donor CU selects an IAB donor DU for the IAB node MT function unit.

When receiving the secondary base station addition request message from the LTE eNB, the IAB donor CU allocates a CU UE X2AP ID to the IAB node MT function unit. The CU UE X2AP ID is used to uniquely identify the IAB node MT function unit on an X2 interface of the IAB donor CU. In this embodiment, the CU UE X2AP ID is also used as an X2 interface identifier of the IAB node MT function unit. In other words, the X2 interface identifier of the IAB node MT function unit includes the CU UE X2AP ID and/or the eNB UE X2AP ID.

One IAB donor includes one IAB donor CU and a plurality of IAB donor DUs. The IAB donor CU selects one IAB donor DU from the plurality of IAB donor DUs for the IAB node MT function unit, and allocates a CU UE F1AP ID to the IAB node MT function unit. The CU UE F1AP ID is used to uniquely identify the IAB node MT function unit on an F1 interface of the IAB donor CU. In this embodiment, the CU UE F1AP ID is used as an F1 interface identifier of the IAB node MT function unit.

After allocating the CU UE F1AP ID and the CU UE X2AP ID, the IAB donor CU may store a correspondence between the CU UE F1AP ID and the CU UE X2AP ID, that is, the CU UE F1AP ID is in a one-to-one correspondence with the CU UE X2AP ID.

Step S705: The IAB donor CU sends a setup request message to the IAB donor DU. Correspondingly, the IAB donor DU receives the setup request message from the IAB donor CU.

The setup request message may be a UE context setup request message. The setup request message includes the CU UE F1AP ID and RRC information that is from the CU to the DU. The RRC information from the CU to the DU refers to some RRC information sent by the IAB donor CU to the IAB donor DU, for example, a capability of the IAB node MT function unit serving as the UE module, the measurement configuration information, and the like.

Step S706: The IAB donor DU sends a setup response message to the IAB donor CU. Correspondingly, the IAB donor CU receives the setup response message from the IAB donor DU.

When receiving the setup request message, the IAB donor DU allocates a DU UE F1AP ID to the IAB node MT function unit. The DU UE F1AP ID is used to uniquely identify the IAB node MT function unit on an F1 interface of the IAB donor DU. In this embodiment, the DU UE F1AP ID is used as an F1 interface identifier of the IAB node MT function unit. In other words, the F1 interface identifier of the IAB node MT function unit includes the DU UE F1AP ID and the CU UE F1AP ID.

The setup response message may be a UE context setup response message that is used to respond to a UE context setup request message. The setup response message includes the DU UE F1AP ID and the CU UE F1AP ID, and further includes RRC information from the DU to the CU and a C-RNTI 2 that is allocated by the IAB donor DU to the IAB node MT function unit on an NR Uu interface. The RRC information from the DU to the CU refers to some RRC information sent by the IAB donor DU to the IAB donor CU. For example, the RRC information may include configuration information about a measurement gap, layer 2 (L2) configuration information of an air interface between the IAB node MT function unit and the IAB donor DU, and the like. The L2 configuration information may include, for example, configuration information of an RLC layer, a MAC layer, a logical channel, and a physical layer.

After allocating the DU UE F1AP ID and the C-RNTI 2 on the NR Uu interface, the IAB donor DU may store a correspondence between the DU UE F1AP ID and the C-RNTI 2, that is, the C-RNTI 2 is in a one-to-one correspondence with the DU UE F1AP ID.

Step S707: The IAB donor CU generates an NR RRC reconfiguration message.

The NR RRC reconfiguration message is used to indicate a radio resource configuration between the IAB node MT function unit and the IAB donor DU.

Step S708: The IAB donor CU sends a secondary base station addition request acknowledgment message to the LTE eNB. Correspondingly, the LTE eNB receives the secondary base station addition request acknowledgment message from the IAB donor CU.

The secondary base station addition request acknowledgment message includes the X2 interface identifier of the IAB node MT function unit on the, for example, the eNB UE X2AP ID and the CU UE X2AP ID, so that the LTE eNB learns a specific IAB node MT function unit to which the secondary base station addition request acknowledgment message is for. The secondary base station addition request acknowledgment message further includes a container from a secondary base station to a primary base station. The container includes the NR RRC reconfiguration message generated by the IAB donor CU, so that the LTE eNB transparently transmits the NR RRC reconfiguration information to the IAB node MT function unit.

If whether to set up an SRB 3 for the IAB node MT function unit is determined by the IAB donor, the NR RRC reconfiguration message includes configuration information of the SRB 3, so that a signaling-plane bearer SRB 3 is set up on an NR Uu interface between the IAB node MT function unit and the IAB donor. For example, the IAB donor determines, based on IAB node indication information received from the LTE eNB, to set up the SRB 3 for the IAB node MT function unit.

Step S709: The LTE eNB sends an LTE RRC reconfiguration message to the IAB node MT function unit. Correspondingly, the IAB node MT function unit receives the LTE RRC reconfiguration message from the LTE eNB.

The LTE RRC reconfiguration message includes the NR RRC reconfiguration message. When receiving the NR RRC reconfiguration message, the LTE eNB encapsulates the NR RRC reconfiguration message into the LTE RRC reconfiguration message, and sends the LTE RRC reconfiguration message to the IAB node MT function unit via a signaling-plane bearer SRB 1/2 of the LTE Uu interface.

Step S710: The IAB node MT function unit sends an LTE RRC reconfiguration complete message to the LTE eNB. Correspondingly, the LTE eNB receives the LTE RRC reconfiguration complete message from the IAB node MT function unit.

The IAB node MT function unit sends the LTE RRC reconfiguration complete message to the LTE eNB via the SRB 1/2 of the LTE Uu interface, to respond to the LTE RRC reconfiguration message.

Step S711: The LTE eNB sends a secondary base station reconfiguration complete message to the IAB donor CU. Correspondingly, the IAB donor CU receives the secondary base station reconfiguration complete message from the LTE eNB.

The IAB donor CU receives the secondary base station reconfiguration complete message, to indicate that the IAB node MT function unit completes reconfiguration of the NR Uu interface.

After step S711, the IAB node MT function unit randomly accesses the IAB donor. The IAB node then enables a function of the DU, and triggers setup of the F1 interface between the IAB donor DU and the IAB donor CU, that is, may perform the embodiment shown in FIG. 4 or FIG. 6.

Figure 10A:
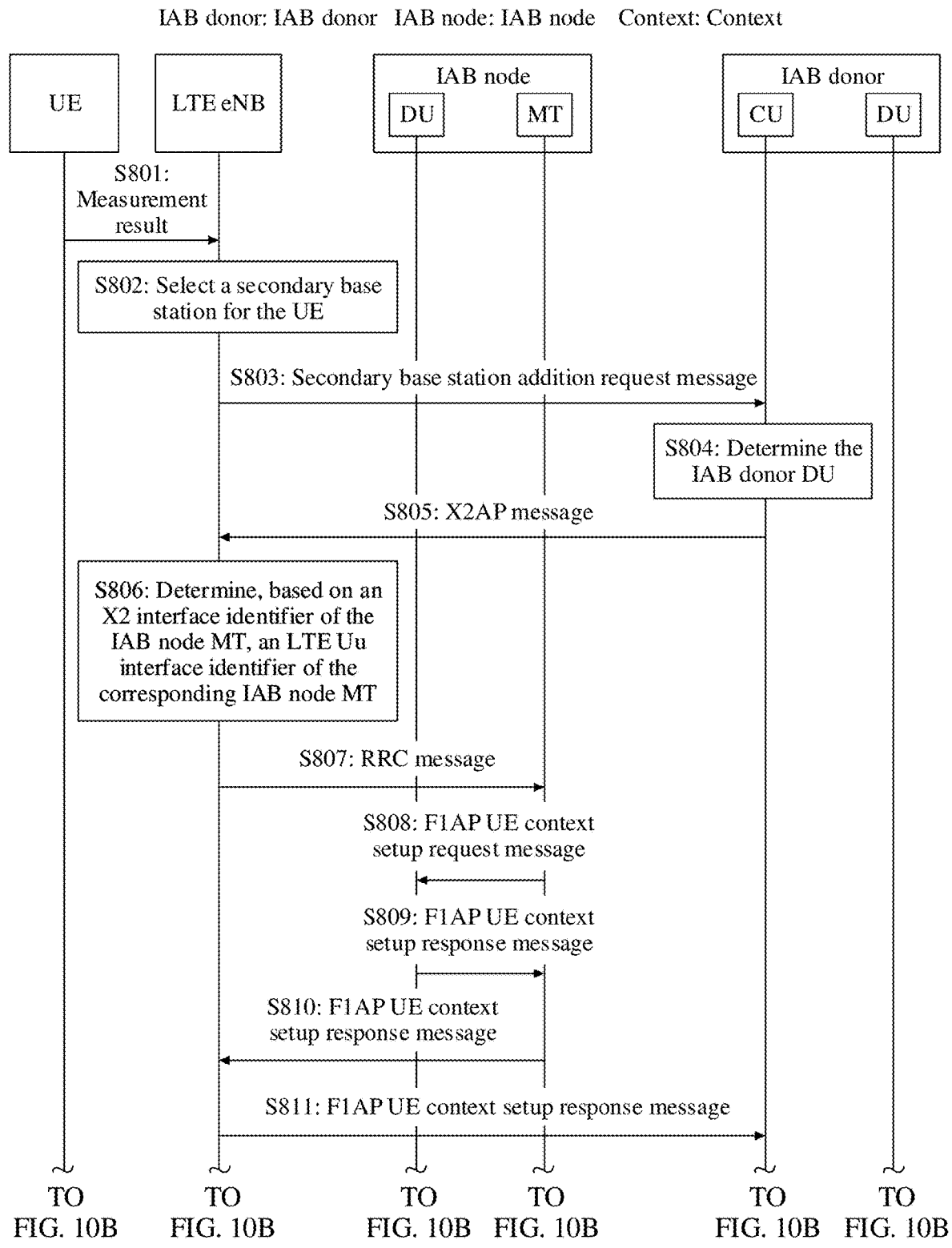
FIG. 10A and FIG. 10B are a schematic flowchart of a communication method according to a fourth Embodiment.
Figure 10B:
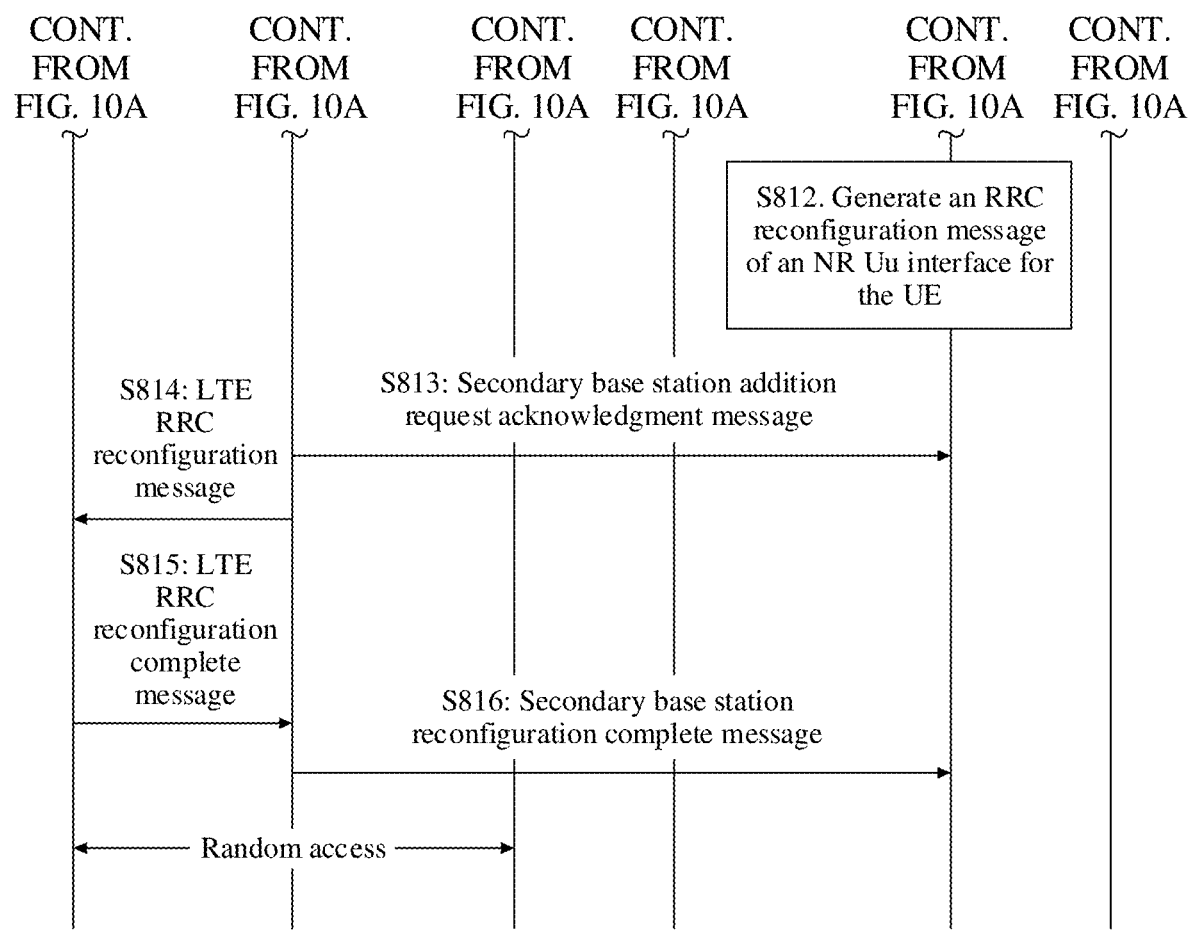

For example, the embodiments are applied to the network architecture shown in the schematic diagram of FIG. 3. FIG. 10A and FIG. 10B are a schematic flowchart of a communication method according to Embodiment 4. This embodiment is a procedure in which an IAB node DU provides an access service for UE, and the procedure is performed after the embodiments shown in FIG. 4 and FIG. 6. The embodiment shown in FIG. 10A and FIG. 10B may include, but is not limited to, the following steps:

Step S801: The UE reports a measurement result to an LTE eNB. Correspondingly, the LTE eNB receives the measurement result from the UE.

The UE may perform RRC measurement based on measurement configuration information delivered by the LTE eNB, and report the measurement result to the LTE eNB.

Step S802: The LTE eNB selects a secondary base station for the UE. In this embodiment, the LTE eNB selects, for the UE, an IAB donor as the secondary base station.

Step S803: The LTE eNB sends a secondary base station addition request message to an IAB donor CU. Correspondingly, the IAB donor CU receives the secondary base station addition request message from the LTE eNB.

The secondary base station addition request message includes the measurement result reported by the UE to the LTE eNB.

Step S804: The IAB donor CU selects an IAB node DU for the UE.

The IAB donor CU selects, based on the measurement result reported by the UE, a cell from measurement results of neighboring cells as a primary cell. For example, the IAB donor CU selects an IAB node DU cell as the primary cell. In this case, for the UE, the IAB node DU and the IAB donor CU are used as the secondary base station of the UE. Then, the IAB donor CU determines, based on a stored correspondence between an X2 interface identifier of an IAB node MT function unit and basic information of the IAB node DU, the IAB node MT function unit corresponding to the IAB node DU.

Step S805: The IAB donor CU sends an X2AP message to the LTE eNB. Correspondingly, the LTE eNB receives the X2AP message from the IAB donor CU.

The X2AP message is a message associated with the IAB node MT function unit. The X2AP message may include the X2 interface identifier of the IAB node MT function unit, for example, an eNB UE X2AP ID and/or a CU UE X2AP ID. The X2AP message may further include an F1AP UE context setup request message that is used to request the IAB node DU to set up context information for the UE.

Step S806: The LTE eNB determines an LTE Uu interface identifier of a corresponding IAB node MT function unit based on the X2 interface identifier of the IAB node MT function unit.

Step S807: The LTE eNB sends an RRC message to the IAB node MT function unit. Correspondingly, the IAB node MT function unit receives the RRC message from the LTE eNB.

The RRC message includes the F1AP UE context setup request message.

Step S808: The IAB node MT function unit sends the F1AP UE context setup request message to the IAB node DU. Correspondingly, the IAB node DU receives the F1AP UE context setup request message from the IAB node MT function unit.

When receiving the RRC message, the IAB node MT function unit extracts the F1AP UE context setup request message from the RRC message, and sends the F1AP UE context setup request message to the IAB node DU through an internal interface.

It may be understood that step S805 to step S808 are a process in which the IAB donor CU sends an F1AP message to the IAB node DU through the X2 interface and the LTE Uu interface. In this case, the F1AP message is the F1AP UE context setup request message. The process is similar to the embodiment shown in FIG. 4. For details, refer to specific descriptions in the embodiment shown in FIG. 4. Details are not described herein again.

Step S809: The IAB node DU generates an F1AP UE context setup response message, and sends the F1AP UE context setup response message to the IAB node MT function unit. Correspondingly, the IAB node MT function unit receives the F1AP UE context setup response message from the IAB node DU.

The F1AP UE context setup response message is used to respond to the F1AP UE context setup request message. The IAB node DU sends the F1AP UE context setup response message to the IAB node MT function unit through the internal interface of the IAB node.

Step S810: The IAB node MT function unit sends the F1AP UE context setup response message to the LTE eNB. Correspondingly, the LTE eNB receives the F1AP UE context setup response message from the IAB node MT function unit.

The IAB node MT function unit sends the F1AP UE context setup response message to the LTE eNB through the LTE Uu interface.

Step S811: The LTE eNB sends the F1AP UE context setup response message to the IAB donor CU. Correspondingly, the IAB donor CU receives the F1AP UE context setup response message from the LTE eNB.

It may be understood that step S809 to step S811 are a process in which the IAB node DU sends an F1AP message to the IAB donor CU through the X2 interface and the LTE Uu interface. In this case, the F1AP message is the F1AP UE context setup response message. The process is similar to the embodiment shown in FIG. 4. For details, refer to specific descriptions in the embodiment shown in FIG. 4. Details are not described herein again.

Step S812: The IAB donor CU generates an NR Uu interface RRC reconfiguration message for the UE.

Step S813: The IAB donor CU sends a secondary base station addition request acknowledgment message to the LTE eNB. Correspondingly, the LTE eNB receives the secondary base station addition request acknowledgment message from the IAB donor CU.

Step S814: The LTE eNB sends an LTE RRC reconfiguration message to the UE. Correspondingly, the UE receives the LTE RRC reconfiguration message from the LTE eNB.

The LTE RRC reconfiguration message includes the NR Uu interface RRC reconfiguration message generated by the IAB donor CU for the UE.

Step S815: The UE sends an LTE RRC reconfiguration complete message to the LTE eNB. Correspondingly, the LTE eNB receives the LTE RRC reconfiguration complete message from the UE.

Step S816: The LTE eNB sends a secondary base station reconfiguration complete message to the IAB donor CU. Correspondingly, the IAB donor CU receives the secondary base station reconfiguration complete message from the LTE eNB.

Step S817: The UE randomly accesses the IAB node DU.

The UE randomly accesses the IAB node DU based on the information obtained in step S814, that is, randomly accesses the IAB node DU based on the NR Uu interface RRC reconfiguration message that is generated by the IAB donor CU for the UE.

In the embodiment shown in FIG. 10A and FIG. 10B, the UE may randomly access the IAB node DU.

It may be understood that, in the foregoing method embodiments, a method or step implemented by the IAB node (that is, the wireless backhaul device) may alternatively be implemented by a component (for example, a chip or a circuit) that can be used in the IAB node. A method or step implemented by the IAB donor (that is, the secondary base station of the wireless backhaul device) may alternatively be implemented by a component (for example, a chip or a circuit) that can be used in the IAB donor. A method or step implemented by the LTE eNB (that is, the primary base station of the wireless backhaul device) may alternatively be implemented by a component (for example, a chip or a circuit) that can be used in the LTE eNB.

The foregoing describes in detail the method in the embodiments. The following provides an apparatus in the embodiments.

Figure 11:
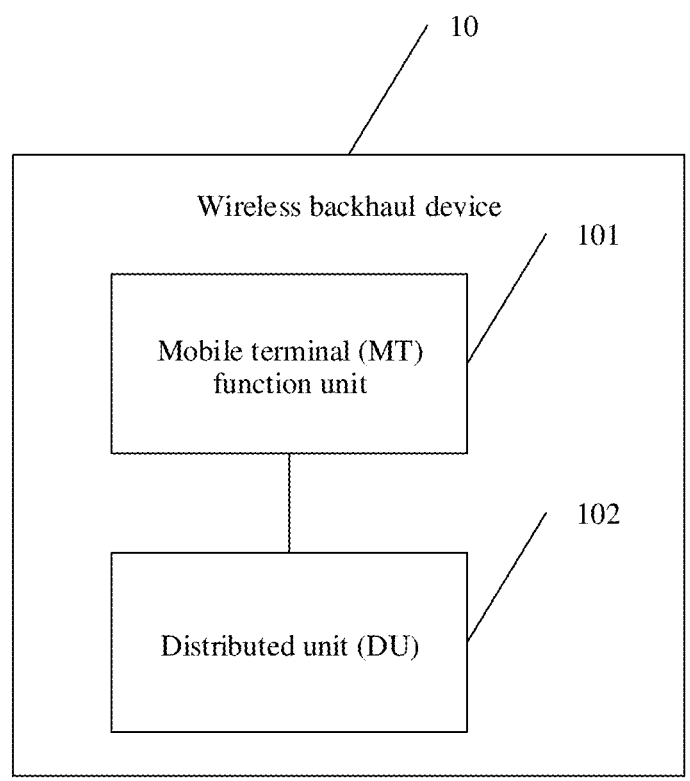
FIG. 11 is a schematic structural diagram of a wireless backhaul device according to an embodiment.

FIG. 11 is a schematic structural diagram of a wireless backhaul device according to an embodiment. The wireless backhaul device 10 includes an MT function unit 101 and a DU 102.

The DU 102 is configured to: generate a first F1AP message, and send the first F1AP message to the MT function unit 101.

The MT function unit 101 is configured to: map the first F1AP message to a signaling-plane bearer of an LTE Uu interface, and send the first F1AP message to a primary base station 30 via the signaling-plane bearer of the LTE Uu interface.

It should be noted that, for functions and operations of the modules in the wireless backhaul device 10, further refer to related descriptions in the method embodiments.

Figure 12:
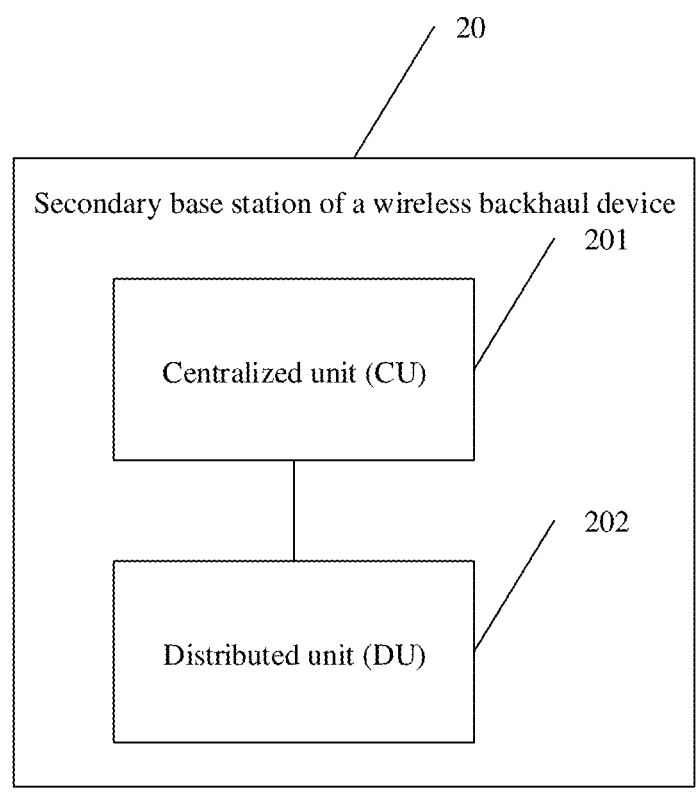
FIG. 12 is a schematic structural diagram of a secondary base station of a wireless backhaul device according to an embodiment.

FIG. 12 is a schematic structural diagram of a secondary base station of a wireless backhaul device according to an embodiment. The secondary base station 20 of the wireless backhaul device includes a CU 201 and a DU 202.

The CU 201 is configured to: receive a first X2AP message from a primary base station, and obtain a first F1AP message based on the first X2AP message, where the first F1AP message is an F1AP message generated by the wireless backhaul device.

It should be noted that, for functions and operations of the modules in the secondary base station 20 of the wireless backhaul device, further refer to related descriptions in the method embodiments.

Figure 13:
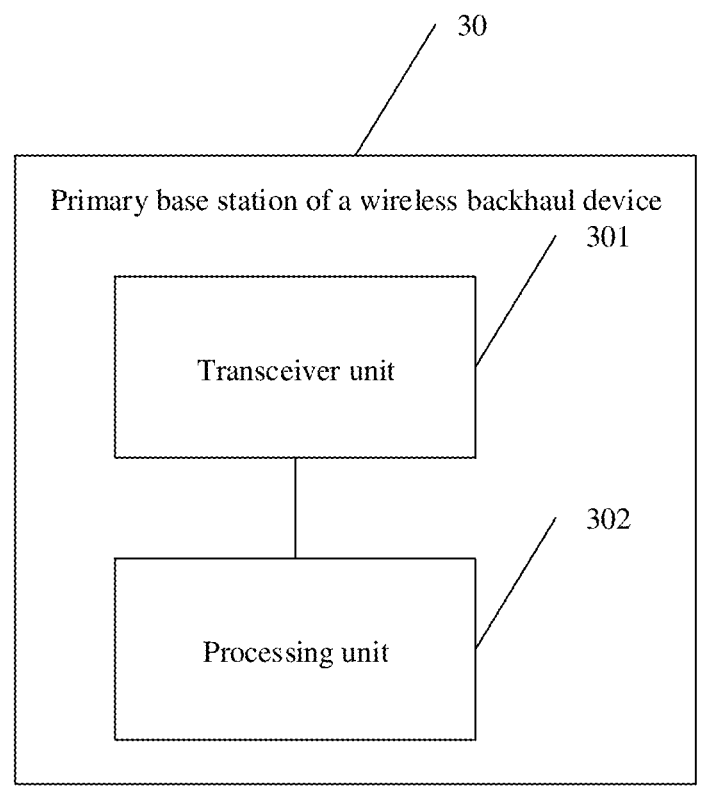
FIG. 13 is a schematic diagram of a logic structure of a primary base station of a wireless backhaul device according to an embodiment.

FIG. 13 is a schematic structural diagram of a primary base station of a wireless backhaul device according to an embodiment. The primary base station 30 of the wireless backhaul device includes a transceiver unit 301 and a processing unit 302.

The transceiver unit 301 is configured to obtain a first F1AP message from an MT function unit 101 via a signaling-plane bearer of an LTE Uu interface, where the first F1AP message is an F1AP message generated by a DU 102, and the processing unit 302 is configured to encapsulate the first F1AP message into a first X2AP message. Alternatively, the transceiver unit 301 is configured to obtain a first RRC message of a first standard from an MT function unit via a signaling-plane bearer of an LTE Uu interface, where the first RRC message of the first standard includes a first F1AP message, and the first F1AP message is an F1AP message generated by a DU 102, and the processing unit 302 is configured to encapsulate the first RRC message of the first standard into a first X2AP message.

The transceiver unit 301 is further configured to send the first X2AP message to a CU 201 of a secondary base station 20.

It should be noted that, for functions and operations of the modules in the primary base station 30 of the wireless backhaul device, further refer to related descriptions in the method embodiments.

Figure 14:
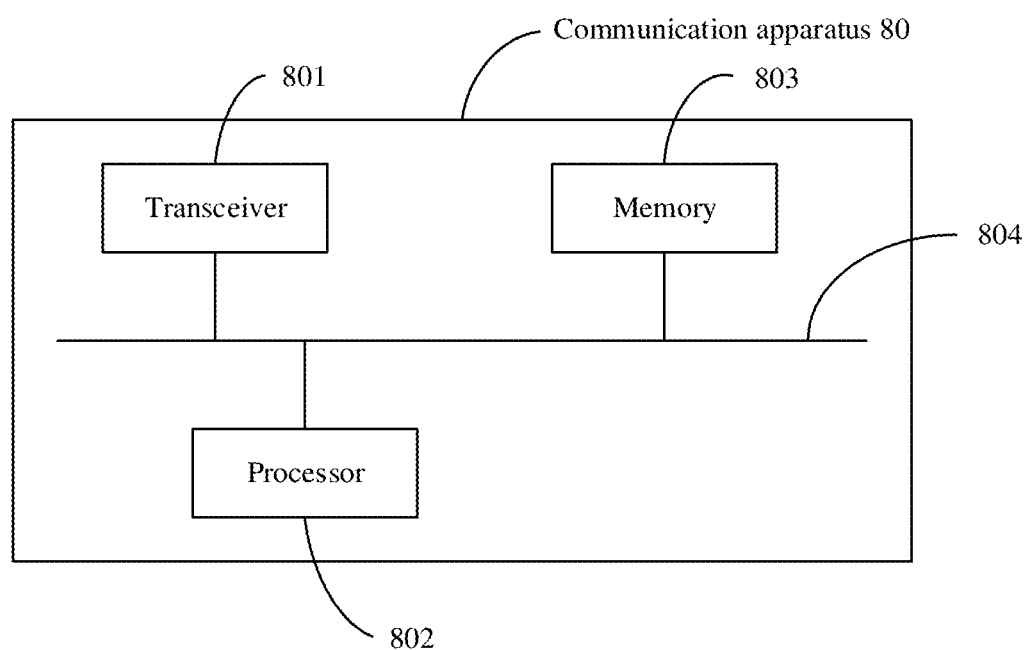
FIG. 14 is a simplified schematic diagram of an entity structure of a communication apparatus according to an embodiment.

FIG. 14 is a simplified schematic diagram of an entity structure of a communication apparatus according to an embodiment. The communication apparatus 80 may be an IAB node (or a component that may be used for the IAB node), may be an IAB donor (or a component that may be used for the IAB donor), or may be an LTE eNB (or a component that may be used for the LTE eNB). The communication apparatus 80 includes one or more transceivers 801 and processors 802, and optionally, may further include a memory 803. The transceiver 801, the processor 802, and the memory 803 may be connected to each other by using a bus 804, or may be connected to each other in another manner. The transceiver 801 may be an input/output interface.

In the IAB node, a DU generates an F1AP message, and an MT function unit encapsulates the F1AP message. Decapsulation may be implemented by using the one or more processors 802. The IAB node MT function unit may send a message by using the transceiver 801. Reference may be further made to related descriptions in the method embodiments.

In the IAB donor, a CU generates an F1AP message, and encapsulates the F1AP message. Decapsulation may be implemented by using the one or more processors 802. The IAB donor may send a message by using the transceiver 801. Reference may be further made to related descriptions in the method embodiments.

A related function implemented by the processing unit 302 shown in FIG. 13 may be implemented by using the one or more processors 802. A related function implemented by the transceiver unit 301 shown in FIG. 13 may be implemented by using the transceiver 801. Reference may be further made to related descriptions in the method embodiments.

The memory 803 includes, but is not limited to, a random access memory (RAM), a read-only memory (ROM), an erasable programmable read-only memory (EPROM), or a compact disc read-only memory (CD-ROM). The memory 803 is configured to store related instructions and/or data. The processor 802 may invoke the instructions in the memory 803, so that the communication apparatus implements the corresponding methods in the foregoing embodiments.

The transceiver 801 is configured to: send data and/or signaling, and receive data and/or signaling.

The processor 802 may include one or more processors, for example, include one or more central processing units (CPU). When the processor 802 is one CPU, the CPU may be a single-core CPU or a multi-core CPU.

The memory 803 is configured to store program code and/or data of the communication apparatus 80.

For steps performed by the processor 802 and the transceiver 801, refer to specific descriptions in the embodiments in FIG. 4, FIG. 6, FIG. 9, and FIG. 10A and FIG. 10B. Details are not described herein again.

It may be understood that FIG. 14 merely shows a simplified implementation of the communication apparatus. In actual, the communication apparatus may further include other necessary components which include but are not limited to any quantity of transceivers, processors, controllers, memories, communication units, and the like. All devices capable of implementing this fall within the protection scope.

An embodiment further provides a communication system, including a wireless backhaul device, a primary base station of the wireless backhaul device, and a secondary base station of the wireless backhaul device. In a possible implementation, the communication system includes the wireless backhaul device and the secondary base station of the wireless backhaul device.

A person of ordinary skill in the art may understand that all or some of the procedures in the methods in the foregoing embodiments may be implemented by a computer program instructing related hardware. The program may be stored in a computer-readable storage medium. When the program is run, the procedures of the methods in the foregoing embodiments are executed. The foregoing storage medium includes any medium that can store program code, such as a ROM, a RAM, a magnetic disk, or an optical disc. Therefore, another embodiment provides a computer-readable storage medium. The computer-readable storage medium stores instructions, and when the instructions are run on a computer, the computer is enabled to perform the methods in the foregoing aspects.

Another embodiment further provides a computer program product including instructions, and when the computer program product runs on a computer, the computer is enabled to perform the methods in the foregoing aspects.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope.

A person of ordinary skill in the art may clearly understand that, for convenient and brief description, for detailed working processes of the foregoing system, apparatus, and unit, refer to corresponding processes in the foregoing method embodiments, and details are not described herein again.

In the several embodiments provided, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, function units in the embodiments may be integrated into one processing module, or each of the units may exist alone physically, or two or more units are integrated into one unit.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a special-purpose computer, a computer network, or another programmable apparatus. The computer instructions may be stored in a computer-readable storage medium, or may be transmitted through a computer-readable storage medium. The computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A wireless backhaul system, comprising:
a wireless backhaul device, a secondary base station of the wireless backhaul device, and a primary base station of the wireless backhaul device, the wireless backhaul device comprises a mobile terminal (MT) function unit and a distributed unit (DU), and the secondary base station comprises a centralized unit (CU), wherein the wireless backhaul device is configured to:
generate a first F1AP message on the DU, and
send the first F1AP message to the MT function unit by using the DU; and
map, on the MT function unit, the first F1AP message to a signaling-plane bearer of an LTE Uu interface, and
send the first F1AP message to the primary base station via the signaling-plane bearer of the LTE Uu interface; the primary base station is configured to:
obtain the first F1AP message from the MT function unit via the signaling-plane bearer of the LTE Uu interface, and
encapsulate the first F1AP message into a first X2AP message; or
obtain a first RRC message of a first standard via the signaling-plane bearer of the LTE Uu interface, wherein the first RRC message of the first standard comprises the first F1AP message, and
encapsulate the first RRC message of the first standard into a first X2AP message; and
send the first X2AP message to the CU of the secondary base station,
encapsulate either the first RRC message of the first standard or the first F1AP message into a first RRC message of a second standard, and
map the first RRC message of the second standard to the signaling-plane bearer of the LTE Uu interface; and the secondary base station is configured to:
receive, on the CU, the first X2AP message from the primary base station, and
obtain, on the CU, the first F1AP message based on the first X2AP message.

2. The system according to claim 1, wherein the wireless backhaul device is further configured to:
comprise, on the MT function unit, the first F1AP message in the first RRC message of the first standard, and
send the first RRC message of the second standard to the primary base station via the signaling-plane bearer of the LTE Uu interface; and the primary base station is further configured to:
receive the first RRC message of the second standard from the MT function unit via the signaling-plane bearer of the LTE Uu interface, wherein the first RRC message of the second standard comprises the first RRC message of the first standard;
obtain the first RRC message of the first standard from the first RRC message of the second standard, wherein the first RRC message of the first standard comprises the first F1AP message; and
encapsulate the RRC message of the first standard into the first X2AP message; and the secondary base station is further configured to obtain, on the CU, the first F1AP message from the first RRC message of the first standard comprised in the first X2AP message.

3. The system according to claim 1, wherein the wireless backhaul device is further configured to:
and
send the first RRC message of the second standard to the primary base station via the signaling-plane bearer of the LTE Uu interface; and the primary base station is configured to:
receive the first RRC message of the second standard from the MT function unit via the signaling-plane bearer of the LTE Uu interface, and
encapsulate the first F1AP message comprised in the RRC message of the second standard into the first X2AP message; and the secondary base station is configured to obtain, on the CU, the first F1AP message comprised in the first X2AP message.

4. The system according to claim 1, wherein the signaling-plane bearer of the LTE Uu interface is an SRB 2.

5. The system according to claim 2, wherein the first RRC message of the second standard is a UL information transfer message.

6. The system according to claim 1, wherein the wireless backhaul device is further configured to:
- encapsulate, on the MT function unit, the first F1AP message into the first RRC message of the first standard,
- map the first RRC message of the first standard to the signaling-plane bearer of the LTE Uu interface, and
- send the first RRC message of the first standard to the primary base station via the signaling-plane bearer of the LTE Uu interface; and the primary base station is configured to:
- receive the first RRC message of the first standard from the MT function unit via the signaling-plane bearer of the LTE Uu interface, wherein the first RRC message of the first standard comprises the first F1AP message, and
- encapsulate the RRC message of the first standard into the first X2AP message; and
- the secondary base station is configured to obtain, on the CU, the first F1AP message from the first RRC message of the first standard comprised in the first X2AP message.

7. The system according to claim 1, wherein the wireless backhaul device is further configured to:
- directly map, on the MT function unit, the first F1AP message to the signaling-plane bearer of the LTE Uu interface, and
- send the first F1AP message to the primary base station via the signaling-plane bearer of the LTE Uu interface; and the primary base station is configured to:
- receive the first F1AP message from the MT function unit via the signaling-plane bearer of the LTE Uu interface, and
- encapsulate the first F1AP message into the first X2AP message; and the secondary base station is configured to obtain, on the CU, the first F1AP message comprised in the first X2AP message.

8. A communication method, applied to a wireless backhaul system comprising a wireless backhaul device and a primary base station of the wireless backhaul device, the wireless backhaul device comprises a mobile terminal (MT) function unit and a distributed unit (DU), and the method comprises:
- generating, by the wireless backhaul device, a first F1AP message on the DU, and sending the first F1AP message to the MT function unit by using the DU; and
- mapping, by the wireless backhaul device on the MT function unit, the first F1AP message to a signaling-plane bearer of an LTE Uu interface;
- sending the first F1AP message to the primary base station via the signaling-plane bearer of the LTE Uu interface;
- encapsulating either a first RRC message of a first standard or the first F1AP message into a first RRC message of a second standard; and
- mapping the first RRC message of the second standard to the signaling-plane bearer of the LTE Uu interface.

9. The method according to claim 8, wherein the mapping, by the wireless backhaul device on the MT function unit, of the first F1AP message to the signaling-plane bearer of an LTE Uu interface, and sending the first F1AP message to the primary base station via the signaling-plane bearer of the LTE Uu interface further comprises:
- comprising, by the wireless backhaul device on the MT function unit, the first F1AP message in a first RRC message of the first standard, and
- sending the first RRC message of the second standard to the primary base station via the signaling-plane bearer of the LTE Uu interface.

10. The method according to claim 8, wherein the mapping, by the wireless backhaul device on the MT function unit, of the first F1AP message to the signaling-plane bearer of an LTE Uu interface, and sending the first F1AP message to the primary base station via the signaling-plane bearer of the LTE Uu interface further comprises:
- sending the first RRC message of the second standard to the primary base station via the signaling-plane bearer of the LTE Uu interface.

11. The method according to claim 8, wherein the signaling-plane bearer of the LTE Uu interface is an SRB 2.

12. The method according to claim 9, wherein the first RRC message of the second standard is a UL information transfer message.

13. The method according to claim 8, wherein the mapping, by the wireless backhaul device on the MT function unit, of the first F1AP message to the signaling-plane bearer of an LTE Uu interface, and sending the first F1AP message to the primary base station via the signaling-plane bearer of the LTE Uu interface further comprises:
- encapsulating, by the wireless backhaul device on the MT function unit, the first F1AP message into a first RRC message of the first standard,
- mapping the first RRC message of the first standard to the signaling-plane bearer of the LTE Uu interface, and
- sending the first RRC message of the first standard to the primary base station via the signaling-plane bearer of the LTE Uu interface.

14. The method according to claim 13, wherein a PDCP layer corresponding to the signaling-plane bearer of the LTE Uu interface comprises indication information, and the indication information is used to indicate that a message comprised at the PDCP layer is an RRC message of the first standard.

15. A wireless backhaul device in a wireless backhaul system, the wireless backhaul system comprising the wireless backhaul device and a primary base station of the wireless backhaul device, the wireless backhaul device comprises a mobile terminal (MT) function unit and a distributed unit (DU), and the wireless backhaul device comprises: at least one processor and at least one memory storing instructions; wherein the instructions are executed by the at least one processor to cause the wireless backhaul device to perform the method of:
- generating a first F1AP message on the DU; and
- sending the first F1AP message to the MT function unit by using the DU; and
- mapping, on the MT function unit, the first F1AP message to a signaling-plane bearer of an LTE Uu interface; and
- sending the first F1AP message to the primary base station via the signaling-plane bearer of the LTE Uu interface;
- encapsulating either a first RRC message of a first standard or the first F1AP message into a first RRC message of a second standard; and
- mapping the first RRC message of the second standard to the signaling-plane bearer of the LTE Uu interface.

16. The device according to claim 15, wherein the mapping on the MT function unit, the first F1AP message to the signaling-plane bearer of an LTE Uu interface, and sending the first F1AP message to the primary base station via the signaling-plane bearer of the LTE Uu interface further comprises:
- comprising, on the MT function unit, the first F1AP message in a first RRC message of the first standard, and sending the first RRC message of the second standard to the primary base station via the signaling-plane bearer of the LTE Uu interface.

17. The device according to claim 15, wherein the mapping on the MT function unit, the first F1AP message to the signaling-plane bearer of the LTE Uu interface, and sending the first F1AP message to the primary base station via the signaling-plane bearer of the LTE Uu interface further comprises:
   sending the first RRC message of the second standard to the primary base station via the signaling-plane bearer of the LTE Uu interface.

18. The device according to claim 15, wherein the signaling-plane bearer of the LTE Uu interface is an SRB 2.

19. The device according to claim 17, wherein the first RRC message of the second standard is a UL information transfer message.

20. The device according to claim 15, wherein the mapping on the MT function unit, the first F1AP message to the signaling-plane bearer of the LTE Uu interface, and sending the first F1AP message to the primary base station via the signaling-plane bearer of the LTE Uu interface further comprises:
   encapsulating, on the MT function unit, the first F1AP message into a first RRC message of the first standard,
   mapping the first RRC message of the first standard to the signaling-plane bearer of the LTE Uu interface, and
   sending the first RRC message of the first standard to the primary base station via the signaling-plane bearer of the LTE Uu interface.

* * * * *